United States Patent
Zhou et al.

(10) Patent No.: US 11,705,955 B2
(45) Date of Patent: Jul. 18, 2023

(54) BEAM FAILURE REPORT RESPONSE

(71) Applicant: QUALCOMM Incorporated, San Diego, CA (US)

(72) Inventors: Yan Zhou, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/096,874

(22) Filed: Nov. 12, 2020

(65) Prior Publication Data

US 2021/0152234 A1    May 20, 2021

Related U.S. Application Data

(60) Provisional application No. 62/936,392, filed on Nov. 15, 2019.

(51) Int. Cl.
*H04B 7/08*    (2006.01)
*H04W 76/19*    (2018.01)
(Continued)

(52) U.S. Cl.
CPC .......... *H04B 7/088* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

2019/0200248 A1* 6/2019 Basu Mallick ...... H04B 7/0695
2020/0267048 A1* 8/2020 Yu ......................... H04L 1/1896
(Continued)

OTHER PUBLICATIONS

Huawei, et al., "Discussion on BFR for SCell", 3GPP TSG RAN WG1 Meeting #94, 3GPP Draft; R1-1809120, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018, 6 Pages, XP051516489, Retrieved from the Internet:URL: http://www.3gpp.org/ftp/tsg%5Fran/WG1%5FRL1/TSGR1%5F94/Docs/R1%2D1809120%2Ezip [retrieved on Aug. 11, 2018] the whole document.
(Continued)

*Primary Examiner* — Marcus Smith
(74) *Attorney, Agent, or Firm* — Loza & Loza, LLP

(57) ABSTRACT

Aspects relate to mechanisms for wireless communication devices to report a beam failure. A UE detects a beam failure with a cell. The UE transmits a beam failure recovery request including an indication of a candidate beam to a base station in response to detecting the beam failure. The base station transmits a beam failure recovery response to the UE indicating whether the beam failure recovery request is received. The UE applies the candidate beam indicated in the beam failure recovery request for a downlink channel following a predetermined number of symbols after an end of the beam failure recovery response. The UE transmits an acknowledgment (ACK) message to the base station when the beam failure recovery response is decoded. The UE applies the candidate beam indicated in the beam failure recovery request for a downlink channel following a predetermined number of symbols after an end of the ACK message.

18 Claims, 16 Drawing Sheets

(51) Int. Cl.
- H04L 1/1812 (2023.01)
- H04W 74/08 (2009.01)
- H04L 5/00 (2006.01)
- H04W 76/11 (2018.01)

(52) U.S. Cl.
CPC ........ *H04W 74/0833* (2013.01); *H04W 76/11* (2018.02); *H04W 76/19* (2018.02)

(56) References Cited

U.S. PATENT DOCUMENTS

| | | | | |
|---|---|---|---|---|
| 2020/0314722 | A1* | 10/2020 | Kyung | H04W 74/0833 |
| 2020/0374960 | A1* | 11/2020 | Deenoo | H04W 72/1284 |
| 2021/0006321 | A1* | 1/2021 | Wang | H04W 16/28 |

OTHER PUBLICATIONS

International Search Report and Written Opinion—PCT/US2020/060554—ISA/EPO—dated Mar. 16, 2021.

LG Electronics Inc: "Discussion on SCell BFR Procedure", 3GPP TSG-RAN WG2 Meeting #108, 3GPP Draft, R2-1915922, 3rd Generation Partnership Project (3GPP), Mobile Competence Centre, 650, Route Des Lucioles; F-06921 Sophia-Antipolis Cedex; France, vol. RAN WG2, No. Reno, USA; Nov. 18, 2019-Nov. 22, 2019, Nov. 11, 2019 (Nov. 11, 2019), pp. 1-3, XP051824293, Retrieved from the Internet: URL: https://ftp.3gpp.org/tsg_ran/WG2_RL2/TSGR2_108/Docs/R2-1915922.zip R2-1915922 Discussion on SCell BFR procedure.docx [retrieved on Nov. 11, 2019] the whole document.

Samsung: "Further Discussion on RRM Requirement for SCell Beam Failure Recovery", 3GPP TSG-RAN WG4 Meeting #93, 3GPP Draft; R4-1913324, 3rd Generation Partnership Project (3GPP), Mobile Competence Centre; 650, Route Des Lucioles; F-06921 Sophia-Antipolis Cedex; France, vol. RAN WG4, No. Reno, NV, USA Nov. 18, 2019-Nov. 22, 2019, pp. 1-8, Nov. 8, 2019 (Nov. 8, 2019), XP051817940, Retrieved from the Internet: URL: https://ftp.3gpp.org/tsg_ran/WG4_Radio/TSGR4_93/Docs/R4-1913324.zip R4-1913324_Discussion_eMIMO_RRM_SCell_BFR_final.docx [retrieved on Nov. 8, 2019] the whole document.

* cited by examiner

BEAM FAILURE REPORT RESPONSE

PRIORITY CLAIM

This application claims priority to and the benefit of Provisional Patent Application No. 62/936,392, titled "BEAM FAILURE REPORT (BFR) RESPONSE" and filed in the U.S. Patent and Trademark Office on Nov. 15, 2019, the entire contents of which are incorporated herein by reference as if fully set forth below in their entireties and for all applicable purposes.

TECHNICAL FIELD

The technology discussed below relates generally to wireless communication systems, and more particularly, to a beam failure report (BFR) response.

INTRODUCTION

In 5G NR, physical channels and reference signals may be transmitted using antenna ports. Two antenna ports may be said to be quasi co-located (QCL) if properties of the channel over which a symbol on one antenna port is conveyed can be inferred from the channel over which a symbol on the other antenna port is conveyed. Accordingly, if two antenna ports are QCL, then a receiving device that detects channel properties of a signal from one antenna port may apply those channel properties to detect a signal from the other, QCL antenna port. In wireless communication systems, such as those specified under standards for 5G NR, both the base station and wireless communication devices may utilize QCL to identify beams for beamforming to compensate for high path loss and short range. Beamforming is a signal processing technique used with an antenna array for directional signal transmission and/or reception. For example, an antenna in the antenna array can transmit a signal that is combined with other signals of other antennas of the same array in such a way that signals at particular angles experience constructive interference while others experience destructive interference. Beamforming may be implemented in traditional cellular network configurations including for 5G NR cell search and synchronization techniques.

As the demand for higher data rates and improved reliability increases, wireless network operators continue to develop mechanisms to maximize throughput and minimize the delay. One such mechanism is the Hybrid Automatic Repeat Request (HARQ) process, which may combine both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender.

In general, HARQ uses a stop and wait (SAW) protocol, in which a transmitting entity waits to receive an acknowledged (ACK) or not acknowledged (NACK) back from the receiving entity before transmitting another packet or retransmitting the same packet. To fully utilize the bandwidth and increase throughput, multiple parallel HARQ processes may be initiated offset in time from one another. Each HARQ process is identified by a unique HARQ process identifier (ID).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method of wireless communication operable at a user equipment (UE) is provided. The method includes detecting a beam failure within a cell. The method also includes transmitting a beam failure recovery request in response to detecting the beam failure. The beam failure recovery request is associated with a hybrid automatic repeat request (HARQ) identification (ID). The beam failure recovery request includes an indication of a candidate beam. The method further includes receiving a beam failure recovery response comprising a downlink control channel including the HARQ ID associated with the beam failure recovery request. The beam failure recovery response indicates whether the beam failure recovery request is received.

A method of wireless communication operable at a base station is provided. The method includes receiving, from a user equipment (UE), a beam failure recovery request indicating a beam failure within a cell associated with the base station. The beam failure recovery request is associated with a hybrid automatic repeat request (HARQ) identification (ID). The beam failure recovery request includes an indication of a candidate beam. The method also includes transmitting a beam failure recovery response to the UE comprising a downlink control channel including the HARQ ID associated with the beam failure recovery request. The beam failure recovery response indicates whether the beam failure recovery request is received.

A user equipment (UE) in a wireless communication system is provided. The UE includes a wireless transceiver. The UE also includes a memory. The UE further includes a processor communicatively coupled to the wireless transceiver and the memory. The processor and the memory are configured to detect a beam failure within a cell. The processor and the memory are also configured to transmit a beam failure recovery request in response to detecting the beam failure. The beam failure recovery request is associated with a hybrid automatic repeat request (HARQ) identification (ID). The beam failure recovery request includes an indication of a candidate beam. The processor and the memory are further configured to receive a beam failure recovery response comprising a downlink control channel including the HARQ ID associated with the beam failure recovery request. The beam failure recovery response indicates whether the beam failure recovery request is received.

A base station in a wireless communication system is provided. The base station includes a wireless transceiver. The base station also includes a memory. The base station further includes a processor communicatively coupled to the wireless transceiver and the memory. The processor and the memory are configured to receive, from a user equipment (UE), a beam failure recovery request indicating a beam failure within a cell associated with the base station. The beam failure recovery request is associated with a hybrid automatic repeat request (HARQ) identification (ID). The beam failure recovery request includes an indication of a candidate beam. The processor and the memory are also configured to transmit a beam failure recovery response to the UE comprising a downlink control channel including the HARQ ID associated with the beam failure recovery request. The beam failure recovery response indicates whether the beam failure recovery request is received.

A non-transitory, processor-readable storage medium of a user equipment (UE) having instructions stored thereon is provided. The instructions, when executed by a processing circuit, cause the processing circuit to detect a beam failure within a cell. The instructions, when executed by the processing circuit, also cause the processing circuit to transmit a beam failure recovery request in response to detecting the beam failure. The beam failure recovery request is associated with a hybrid automatic repeat request (HARQ) identification (ID). The beam failure recovery request includes an indication of a candidate beam. The instructions, when executed by the processing circuit, further cause the processing circuit to receive a beam failure recovery response comprising a downlink control channel including the HARQ ID associated with the beam failure recovery request. The beam failure recovery response indicates whether the beam failure recovery request is received.

A non-transitory, processor-readable storage medium of a base station having instructions stored thereon is provided. The instructions, when executed by a processing circuit, cause the processing circuit to receive, from a user equipment (UE), a beam failure recovery request indicating a beam failure within a cell associated with the base station. The beam failure recovery request is associated with a hybrid automatic repeat request (HARQ) identification (ID). The beam failure recovery request includes an indication of a candidate beam. The instructions, when executed by the processing circuit, also cause the processing circuit to transmit a beam failure recovery response to the UE comprising a downlink control channel including the HARQ ID associated with the beam failure recovery request. The beam failure recovery response indicates whether the beam failure recovery request is received.

A user equipment (UE) is provided. The UE includes a means for detecting a beam failure within a cell. The UE also includes a means for transmitting a beam failure recovery request in response to detecting the beam failure. The beam failure recovery request is associated with a hybrid automatic repeat request (HARQ) identification (ID). The beam failure recovery request includes an indication of a candidate beam. The UE further includes a means for receiving a beam failure recovery response comprising a downlink control channel including the HARQ ID associated with the beam failure recovery request. The beam failure recovery response indicates whether the beam failure recovery request is received.

A base station is provided. The base station includes a means for receiving, from a user equipment (UE), a beam failure recovery request indicating a beam failure within a cell associated with the base station. The beam failure recovery request is associated with a hybrid automatic repeat request (HARQ) identification (ID). The beam failure recovery request includes an indication of a candidate beam. The base station also includes a means for transmitting a beam failure recovery response to the UE comprising a downlink control channel including the HARQ ID associated with the beam failure recovery request. The beam failure recovery response indicates whether the beam failure recovery request is received.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
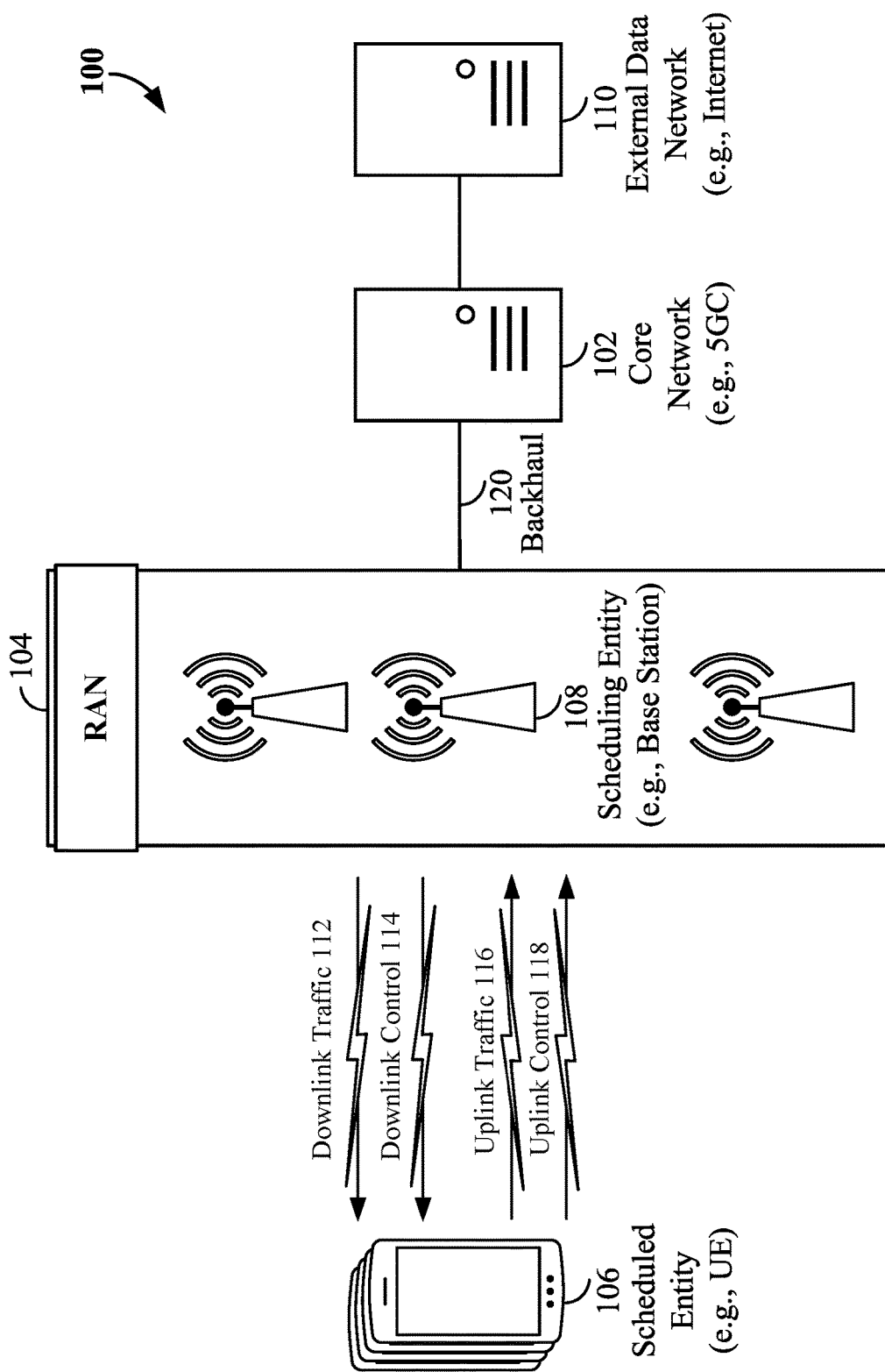
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station (e.g., gNode B (gNB)) may provide a UE with a set of transmission configuration indication (TCI) state configurations in a downlink control information (DCI) message. Each TCI state configuration contains parameters for configuring a QCL relationship between one or two downlink reference signals and demodulation reference signal (DM-RS) ports of a physical downlink shared channel (PDSCH), the DM-RS port of a physical downlink control channel (PDCCH) or channel state information reference signal (CSI-RS) port(s) of a CSI-RS resource. In addition, the TCI state can include a beam indication. In this way, a gNB may inform a UE that a certain PDSCH and/or PDCCH transmission uses the same transmission beam as a configured reference signal. In simple terms, it may be said that a TCI state can include a beam indication that explicitly identifies which downlink beam is being used by the gNB.

Once these TCI state configurations are provided to the UE, a gNB may activate or deactivate the provided TCI states for a given UE by transmitting a certain medium access control (MAC) control element (MAC-CE), which may be referred to as the "TCI States Activation/Deactivation for UE-specific PDSCH MAC-CE" in 3GPP TS 38.321 section 6.1.3.14, Release 15 and Release 16. This MAC-CE is identified by a MAC subheader that includes a serving cell ID, a bandwidth part (BWP) ID, and a parameter $T_i$ that indicates the activation or deactivation status of the TCI state with TCI-StateId i. Here, i is an integer index value that indexes the list of TCI states previously provided to the UE.

One aspect of this MAC-CE is that it activates TCI states only for an identified component carrier (CC) or bandwidth part (BWP). That is, because the MAC-CE may include a single BWP ID, a separate such MAC-CE may be needed for each CC or BWP.

In 5G NR, carrier aggregation (CA) is supported. CA refers to the concatenation of multiple component carriers (CCs), providing increased bandwidth. Such 5G networks may provide for aggregation of sub-6 GHz carriers, above-6 GHz carriers, mmWave carriers, etc., all controlled by a single integrated MAC layer. The aggregated CCs can be contiguous to one another, or non-contiguous, and they may be inter-band or intra-band. Further, the aggregated CCs can use different numerologies, e.g., having different subcarrier spacing (SCS), slot lengths, etc. In some examples, one of the CCs may be referred to as a primary cell (PCell), while one or more other CCs may be referred to as secondary cells (SCell).

In a RACH procedure, an SCell beam failure report (BFR) response may include an uplink grant for new transmissions with a same HARQ process ID as that of the step 2 MAC-CE. However, if the step 2 MAC-CE is transmitted in msgA in a 2-step RACH procedure, or in msg3 in a 4-step RACH procedure, then the step 2 MAC-CE may not necessarily have a HARQ process ID. Accordingly, a UE may have ambiguity as to whether a received BFR response actually corresponds to the step 2 MAC-CE that the UE transmits as the BFR request message. Therefore, in some aspects, a status of such a BFR response message may be clarified when the step 2 MAC-CE is transmitted in msgA or msg3 in a corresponding RACH procedure. Furthermore, in some aspects, a corresponding beam resetting time may be clarified.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
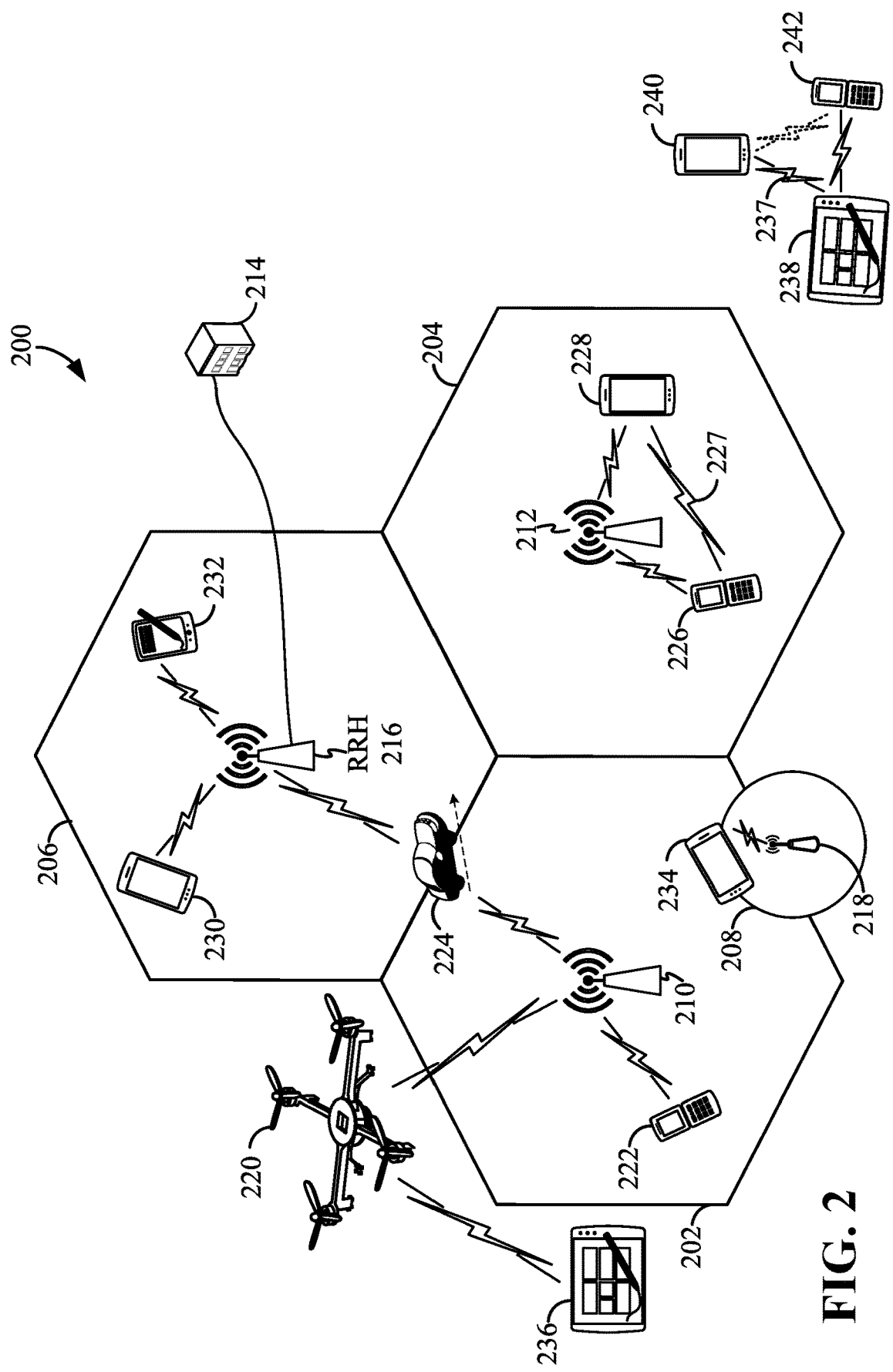
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204, 206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an AMF.

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
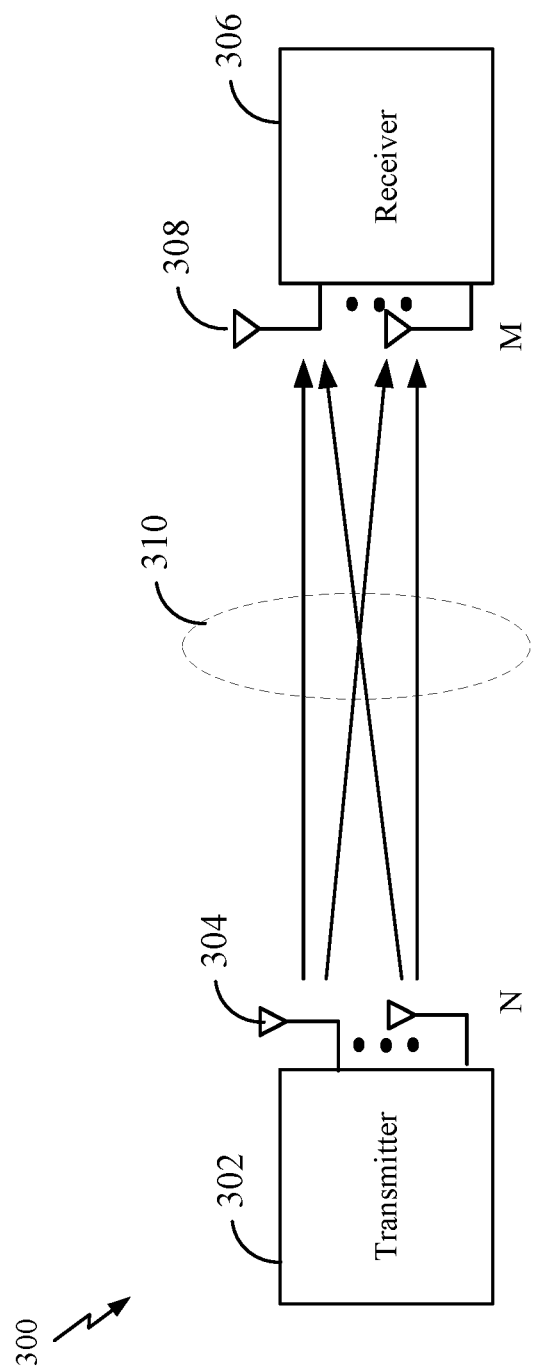
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements. The beam may be alternatively made with a certain reference signal resource. The beam may be equivalent to a spatial domain filtering by which an electromagnetic (EM) radiation is transmitted.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

Figure 4:
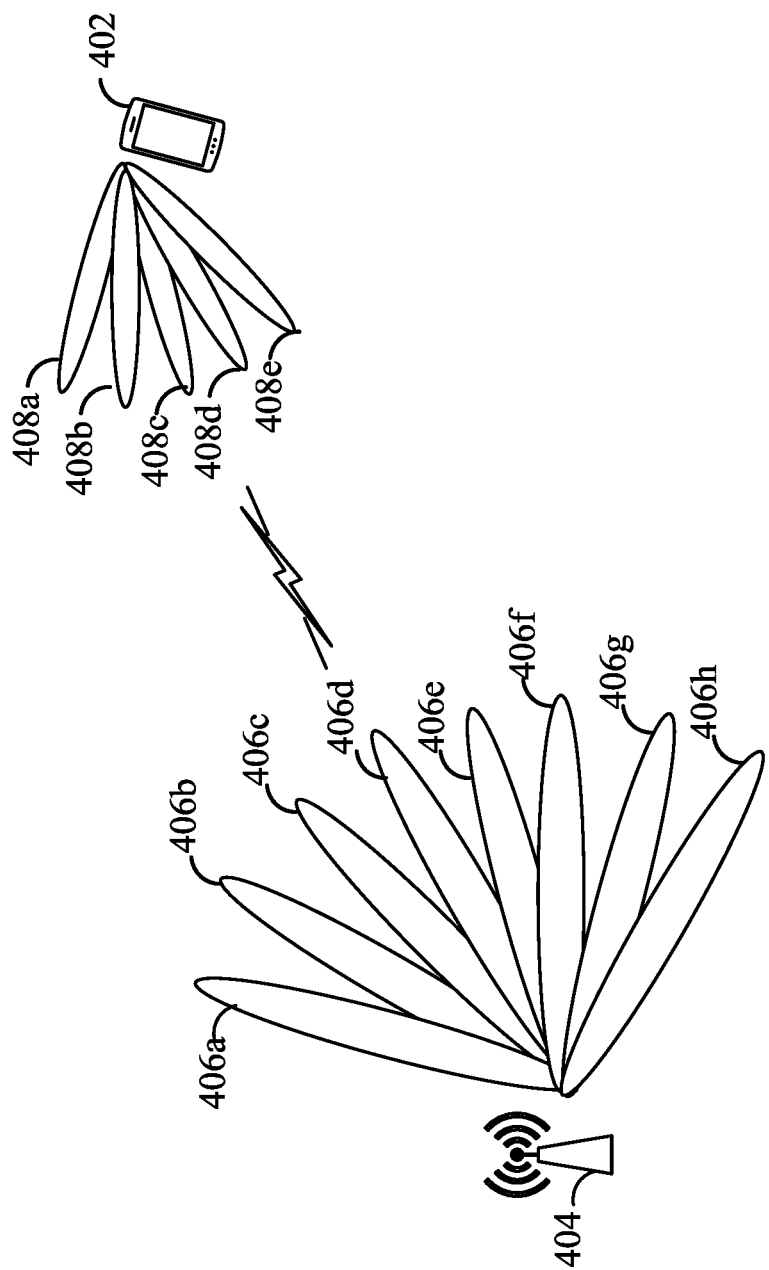
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1-3, and the UE 402 may be any of the UEs or scheduled entities illustrated in FIGS. 1-3.

The base station 404 may generally be capable of communicating with the UE 402 using one or more transmit beams, and the UE 402 may further be capable of communicating with the base station 404 using one or more receive beams. As used herein, the term transmit beam refers to a beam on the base station 404 that may be utilized for downlink or uplink communication with the UE 402. In addition, the term receive beam refers to a beam on the UE 402 that may be utilized for downlink or uplink communication with the base station 404.

In the example shown in FIG. 4, the base station 404 is configured to generate a plurality of transmit beams 406a, 406b, 406c, 406d, 406e, 406f, 406g, and 406h (406a-406h), each associated with a different spatial direction. In addition, the UE 402 is configured to generate a plurality of receive beams 408a, 408b, 408c, 408d, and 408e (408a-408e), each associated with a different spatial direction. It should be noted that while some beams are illustrated as adjacent to one another, such an arrangement may be different in different aspects. For example, transmit beams 406a-406h transmitted during a same symbol may not be adjacent to one another. In some examples, the base station 404 and UE 402 may each transmit more or less beams distributed in all directions (e.g., 360 degrees) and in three-dimensions. In addition, the transmit beams 406a-406h may include beams of varying beam width. For example, the base station 404 may transmit certain signals (e.g., synchronization signal blocks (SSBs)) on wider beams and other signals (e.g., CSI-RSs) on narrower beams.

The base station 404 and UE 402 may select one or more transmit beams 406a-406h on the base station 404 and one or more receive beams 408a-408e on the UE 402 for communication of uplink and downlink signals therebetween using a beam management procedure. In one example, during initial cell acquisition, the UE 402 may perform a P1 beam management procedure to scan the plurality of transmit beams 406a-406h on the plurality of receive beams 408a-408e to select a beam pair link (e.g., one of the transmit beams 406a-406h and one of the receive beams 408a-408e) for a physical random access channel (PRACH) procedure for initial access to the cell. For example, periodic SSB beam sweeping may be implemented on the base station 404 at certain intervals (e.g., based on the SSB periodicity). Thus, the base station 404 may be configured to sweep or transmit an SSB on each of a plurality of wider transmit beams 406a-406h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 404 and UE 402 may perform a P2 beam management procedure for beam refinement at the base station 404. For example, the base station 404 may be configured to sweep or transmit a CSI-RS on each of a plurality of narrower transmit beams 406a-406h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). The UE 402 is configured to scan the plurality of CSI-RS transmit beams 406a-406h on the plurality of receive beams 408a-408e. The UE 402 then performs beam measurements (e.g., RSRP, SINR, etc.) of the received CSI-RSs on each of the receive beams 408a-408e to determine the respective beam quality of each of the CSI-RS transmit beams 406a-406h as measured on each of the receive beams 408a-408e.

The UE 402 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 406a-406h on one or more of the receive beams 408a-408e to the base station 404. The base station 404 may then select one or more CSI-RS transmit beams on which to communicate downlink and/or uplink control and/or data with the UE 402. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 404 may configure the UE 402 to perform SSB beam measurements and provide an L1 measurement report containing beam measurements of SSB transmit beams 406a-406h. For example, the base station 404 may configure the UE 402 to perform SSB beam measurements and/or CSI-RS beam measurements for beam failure detection (BRD), beam failure recovery (BFR), cell reselection, beam tracking (e.g., for a mobile UE 402 and/or base station 404), or other beam optimization purpose.

In addition, when the channel is reciprocal, the transmit and receive beams may be selected using an uplink beam management scheme. In an example, the UE 402 may be configured to sweep or transmit on each of a plurality of receive beams 408a-408e. For example, the UE 402 may transmit an SRS on each beam in the different beam directions. In addition, the base station 404 may be configured to receive the uplink beam reference signals on a plurality of transmit beams 406a-406h. The base station 404 then performs beam measurements (e.g., RSRP, SINR, etc.) of the beam reference signals on each of the transmit beams 406a-406h to determine the respective beam quality of each of the receive beams 408a-408e as measured on each of the transmit beams 406a-406h.

The base station 404 may then select one or more transmit beams on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 406d) on the base station 404 and a single receive beam (e.g., beam 408c) on the UE may form a single BPL used for communication between the base station 404 and the UE 402. In another example, multiple CSI-RS transmit beams (e.g., beams 406c, 406d, and 406e) on the base station 404 and a single receive beam (e.g., beam 408c) on the UE 402 may form respective BPLs used for communication between the base station 404 and the UE 402. In another example, multiple CSI-RS transmit beams (e.g., beams 406c, 406d, and 406e) on the base station 404 and multiple receive beams (e.g., beams 408c and 408d) on the UE 402 may form multiple BPLs used for communication between the base station 404 and the UE 402. In this example, a first BPL may include transmit beam 406c and receive beam 408c, a second BPL may include transmit beam 408d and receive beam 408c, and a third BPL may include transmit beam 408e and receive beam 408d.

Various aspects of the present disclosure will be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
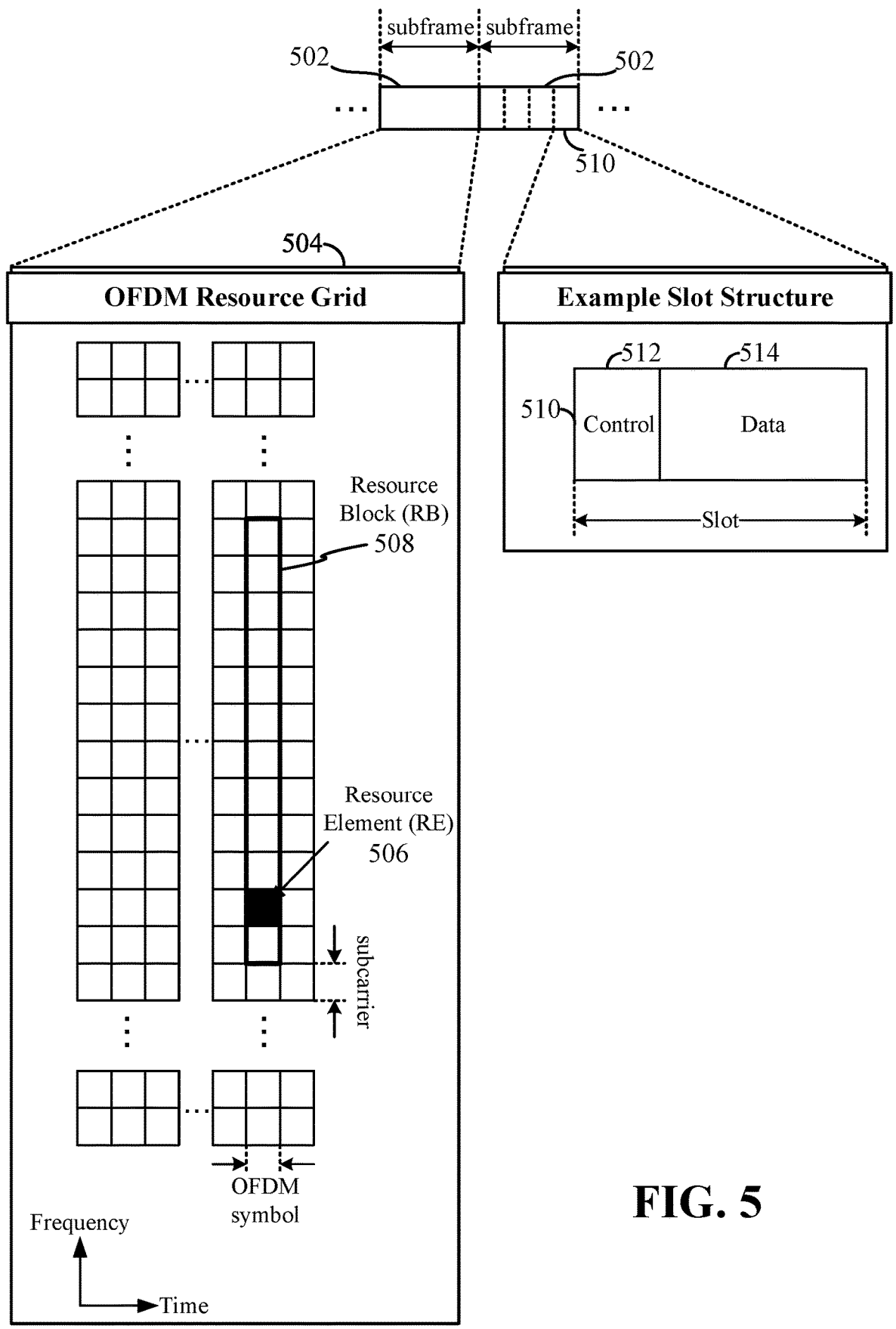
FIG. 5 is a schematic illustration of an organization of wireless resources in an air interface utilizing orthogonal frequency divisional multiplexing (OFDM) according to some embodiments.

Referring now to FIG. 5, an expanded view of an exemplary DL subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of UEs (e.g., scheduled entities) for downlink or uplink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a proximity service (ProSe) PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
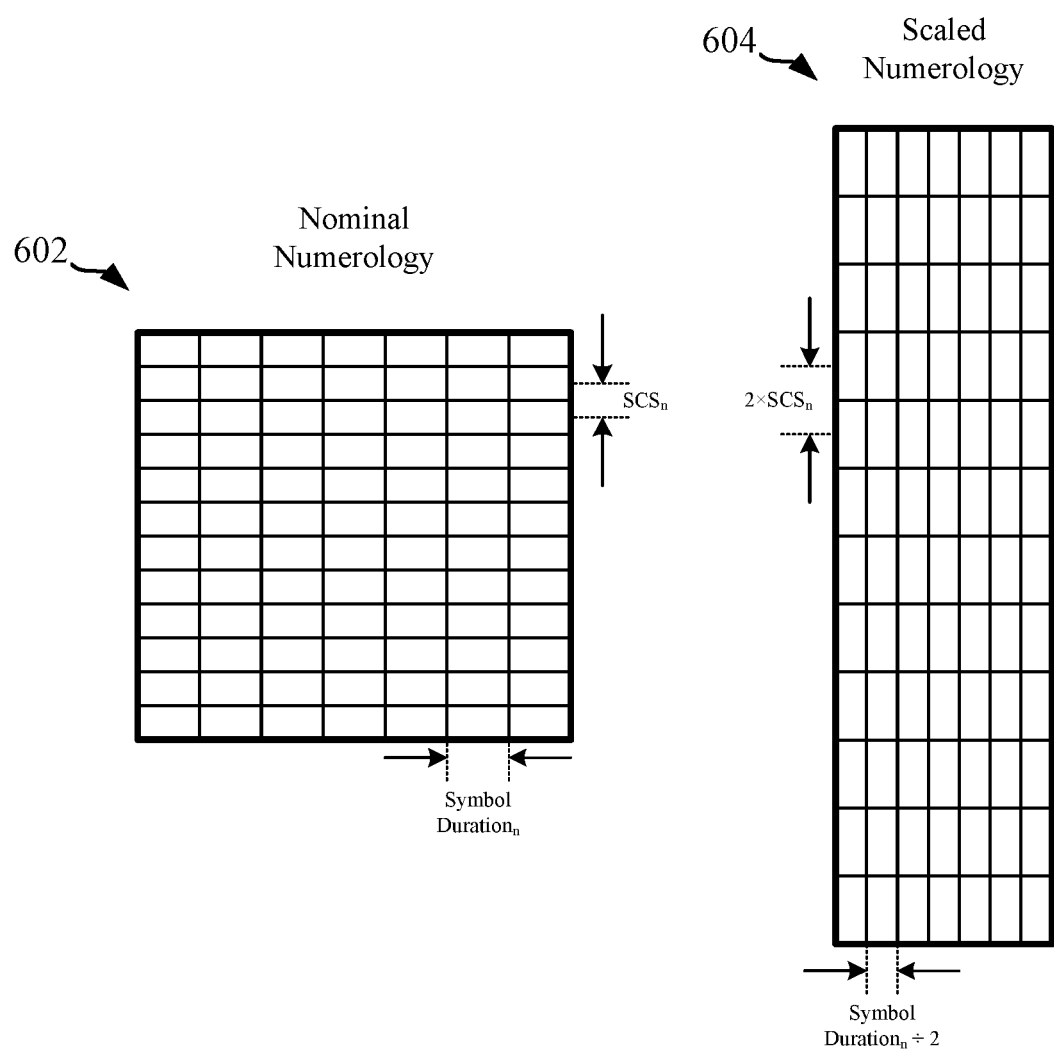
FIG. 6 is a schematic illustration of an OFDM air interface utilizing a scalable numerology according to some aspects of the disclosure.

To illustrate this concept of a scalable numerology, FIG. 6 shows a first RB 602 having a nominal numerology, and a second RB 604 having a scaled numerology. As one example, the first RB 602 may have a 'nominal' subcarrier spacing $(SCS_n)$ of 30 kHz, and a 'nominal' symbol duration$_n$ of 333 µs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 µs.

Figure 7:
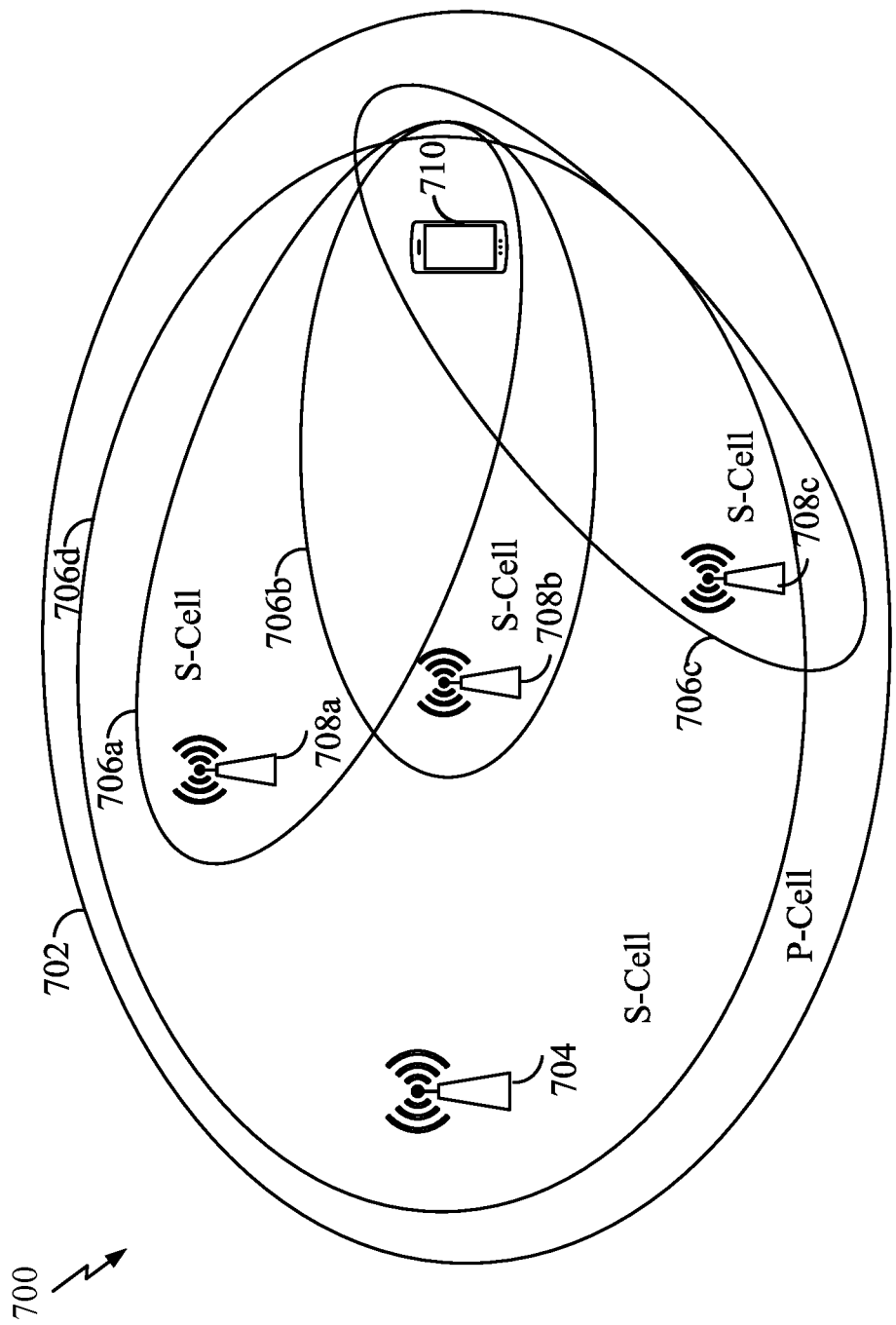
FIG. 7 is a diagram illustrating a multi-cell transmission environment according to some aspects.

5G-NR networks may further support carrier aggregation of component carriers transmitted from different transmission and reception points (TRPs) in a multi-cell transmission environment. An example of a multi-cell transmission environment 700 is shown in FIG. 7. The multi-cell transmission environment 700 includes a primary serving cell (PCell) 702 and one or more secondary serving cells (SCells) 706a, 706b, 706c, and 706d. The PCell 702 may be referred to as the anchor cell that provides a radio resource control (RRC) connection to a UE 710. In some examples, the PCell and one or more of the SCells may be collocated (e.g., different transmission reception point (TRPs) may be at the same location).

When carrier aggregation is configured, one or more of the SCells 706a-706d may be activated or added to the PCell 702 to form the serving cells serving the UE 710. Each serving cell corresponds to a component carrier (CC). The CC of the PCell 702 may be referred to as a primary CC, and the CC of a SCell 706a, 706b, 706c, and 706d (706a-706d) may be referred to as a secondary CC. The PCell 702 and one or more of the SCells 706 may be served by a respective TRP 704 and 708a-708c. Each TRP 704 and 708a-708c may be a base station (e.g., gNB), remote radio head of a gNB, or other scheduling entity similar to those illustrated in any of FIGS. 1-4. In some examples, a base station may include multiple TRPs, each corresponding to one of a plurality of collocated or non-collocated antenna arrays, each supporting a different component carrier. In the example shown in FIG. 7, SCells 706a-706c are served by respective non-collocated TRPs 708a-708c. In addition, SCell 706d and PCell 702 are collocated and served by respective collocated TRPs 704 (only one of which is shown for convenience). Here, each of the TRPs serving cells 702 and 706d may be associated with a single base station 704. The coverage of the PCell 702 and SCell 706d may differ since component carriers in different frequency bands may experience different path loss.

The PCell 702 may add or remove one or more of the SCells 706a-706d to improve reliability of the connection to the UE 710 and/or increase the data rate. However, the PCell 702 may only be changed upon a handover to another PCell. In some examples, the PCell 702 may utilize a first radio access technology (RAT), such as LTE, while one or more of the SCells 706 may utilize a second RAT, such as 5G-NR. In this example, the multi-cell transmission environment may be referred to as a multi-RAT-dual connectivity (MR-DC) environment. In some examples, the PCell 702 may be a low band cell, and the SCells 706 may be high band cells. A low band (LB) cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

The PCell 702 is responsible not only for connection setup, but also for radio resource management (RRM) and radio link monitoring (RLM) of the connection with the UE 710. For example, the PCell 702 may activate one or more of the SCells (e.g., SCell 706a) for multi-cell communication with the UE 710. In some examples, the PCell may activate the SCell 706a on an as-needed basis instead of maintaining the SCell activation when the SCell 706a is not utilized for data transmission/reception in order to reduce power consumption by the UE 710.

In 5G NR, beam failure detection and recovery procedures may be utilized. Generally, a beam failure may correspond to a condition where a quality of a beam falls to an unacceptably low level. In one example, a UE (e.g., UE 710) may consider a beam failure instance to occur when a measured quality of a downlink reference signal falls below a given threshold (e.g., a predetermined threshold). In some examples, a UE may utilize a measurement of a reference signal received power (RSRP) corresponding to a received CSI-RS or SSB. Once the UE detects a given number (e.g., a predetermined number) of consecutive such beam failure instances, the UE may then declare a beam failure, and accordingly initiate a beam failure recovery (BFR) procedure.

According to one example of a BFR procedure, a UE may search for a new candidate beam to restore connectivity. Here, the UE may measure a quality (e.g., a RSRP) of one or more reference signals on a given set of candidate beams. If the measured quality is greater than a certain threshold (e.g., a predetermined threshold), then that beam is considered one on which connectivity may be restored.

Once a UE identifies such a candidate beam, the UE may trigger the transmission of a BFR Request, informing the gNB (e.g., PCell 702 or one of the SCells) that the UE has detected a beam failure. Here, the BFR Request message may include information identifying a candidate beam found in the UE's candidate beam search. In some examples, the UE may utilize a random access procedure for transmission of the BFR request. An example of a random access procedure is one in which a UE transmits a random access preamble and a payload (msgA). If a gNB detects a random access preamble and decodes the payload, it responds by transmitting a random access response (RAR, or msgB).

Corresponding to a BFR procedure, the payload of the UE's random access message (msgA) may include information identifying the candidate beam found in the UE's candidate beam search. For example, each candidate beam may be associated with a specific random access preamble configuration, such that the gNB may receive the UE's identified candidate beam by detecting the specific random access preamble configuration. In some examples, the payload of the UE's random access message may be referred to as a "step 2 MAC-CE." Here, step 2 may refer to a series of steps in the UE's BFR procedure. Further, the random access response that the gNB transmits may be referred to as a BFR response.

In some examples, a predetermined number of symbols after the UE receives a secondary cell (SCell) BFR response to the step 2 MAC-CE, the beams of all CORESETs in the failed SCell will be reset to the reported new beam in the step 2 MAC-CE. Thus, in each of the SCells, if there is a beam failure, the UE may transmit a beam candidate to a gNB via the BFR message (step 2 MAC-CE), and the gNB may transmit a BFR response. After receiving the BFR response, the UE waits for the predetermined number of symbols. After waiting the predetermined number of symbols following receipt of the BFR response, the UE may apply the identified downlink beam that it conveyed to the gNB for all CORESETS in the failed SCell.

Furthermore, for at least the PDCCH, the predetermined number of symbols after receiving the BFR response to the step 2 MAC-CE, a UE may apply the new beam indicated in the step 2 MAC-CE, at least for the DL reception on the failed SCell if a new beam is identified. This may apply for all CORESETs in the failed SCell.

Figure 8:
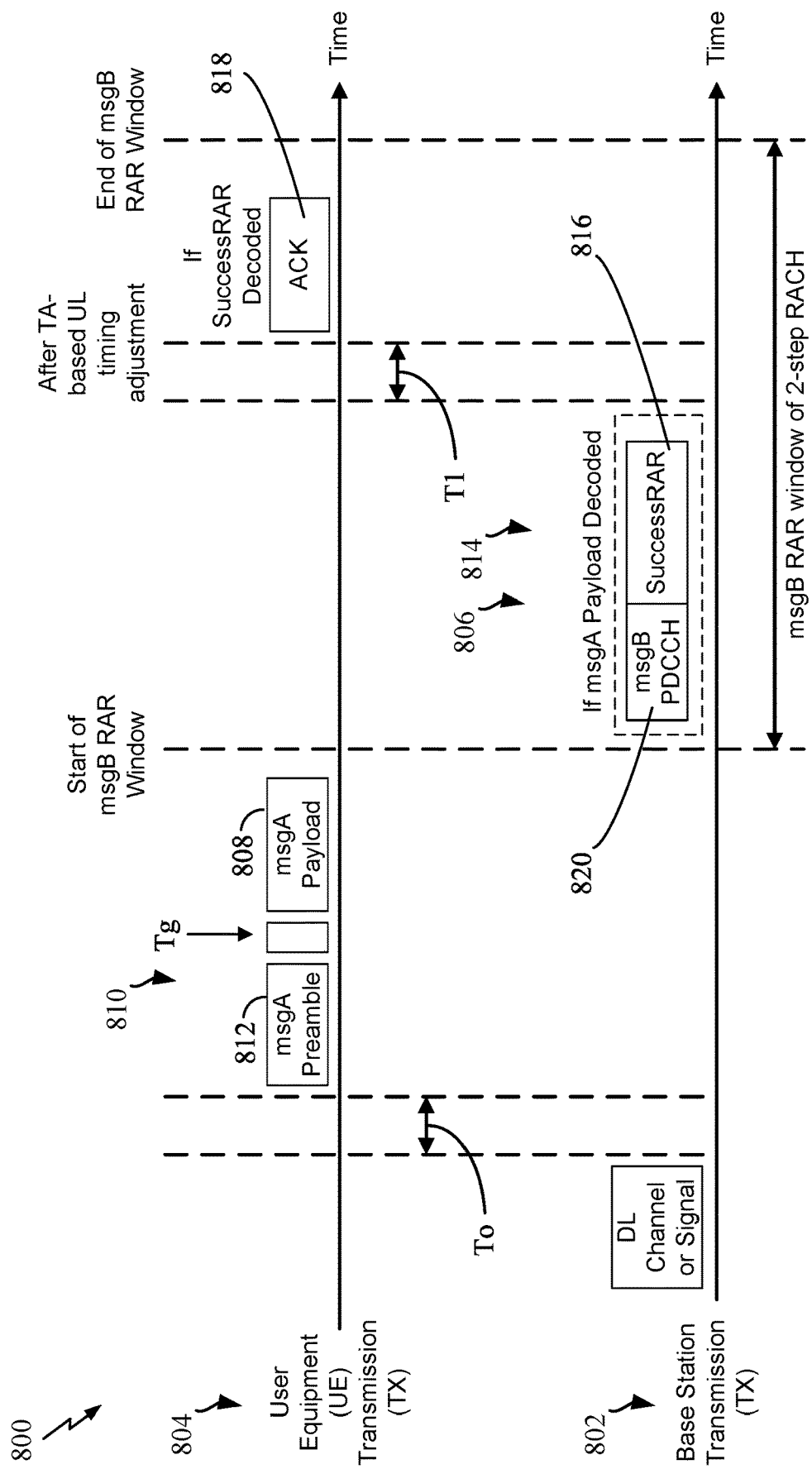
FIG. 8 is a conceptual signaling diagram illustrating an exemplary 2-step RACH procedure corresponding to a beam failure report (BFR) process according to some aspects.

FIG. 8 is a conceptual signaling diagram 800 illustrating an exemplary 2-step RACH procedure corresponding to a beam failure report (BFR) process according to some aspects. As discussed herein, the SCell BFR response may include an uplink grant for new transmissions with the same HARQ process ID as that of the step 2 MAC-CE. However, if the step 2 MAC-CE is transmitted in msgA in a 2-step RACH procedure, or in msg3 in a 4-step RACH procedure, then the step 2 MAC-CE may not necessarily have a HARQ process ID. Accordingly, a UE may have ambiguity as to whether a received BFR response actually corresponds to the step 2 MAC-CE that the UE transmits as the BFR request message. Therefore, in some aspects, a status of such a BFR response message may be clarified when the step 2 MAC-CE is transmitted in msgA or msg3 in a corresponding RACH procedure. Furthermore, in some aspects, a corresponding beam resetting time may be clarified.

In some aspects, as shown in FIG. 8, when a gNB 802 transmits to a UE 804 a BFR response 806 in response to a step 2 MAC-CE transmitted by the UE 804 in the payload 808 of msgA 810 (also having a msg A preamble 812) in a 2-step RACH procedure, the BFR response 806 may be clarified. For example, when a gNB 802 receives and decodes the payload 808 of the msgA 810 in a 2-step RACH procedure, the gNB 802 may respond by transmitting a RAR 814 that includes a SuccessRAR information element 816. Here, when the UE 804 receives the SuccessRAR information element 816 in the random access response as msgB, the UE 804 may respond with an acknowledgment (ACK) 818 indicating that the BFR response message was received. Here, the UE 804 may receive this SuccessRAR information element 816 transmission as explicit confirmation that the gNB 802 received the msgA payload 808. Here, the corresponding CORESET beam resetting time may follow one of at least two options. As a first option, a predetermined number of symbols after an end of the ACK 818 for the BFR response 806 (e.g., msgB including SuccessRAR information element 816), the UE 804 may set the beams of all CORESETs in the failed SCell to the reported new candidate beam identified in the UE's transmission of the BFR request message. As a second option, a predetermined number of symbols after an end of the BFR response 806 (e.g., msgB including SuccessRAR information element 816), the UE 804 may set the beams of all CORESETs in the failed SCell to the reported new candidate beam identified in the UE's transmission of the BFR request message. A counting of the predetermined number of symbols may begin either at the end of msgB, or at the end of the ACK 818 for msgB.

As described herein, when a gNB 802 transmits to the UE 804 a BFR response 806 in response to a step 2 MAC-CE transmitted by the UE 804 in the payload 808 of msgA 810 in a 2-step RACH procedure, the BFR response 806 may be clarified. Rather than transmitting a random access response, a gNB may instead transmit a PDCCH transmission 820 scheduling DL or UL transmissions with a given HARQ process ID. Here, the PDCCH transmission 820 can serve as the BFR response 806. In an example where the UE's transmission of msgA 810 has an assigned HARQ ID, then that HARQ ID may accordingly be assigned as the HARQ ID that the gNB 802 assigns to the corresponding PDCCH transmission 820. Further, if the PDCCH transmission 820 schedules an UL transmission, and if that scheduled UL transmission includes uplink control information (UCI), then the above given HARQ ID may be the HARQ ID of the uplink control information (UCI). Still further, the scheduled DL or UL of the PDCCH transmission 820 may include only new transmissions, or alternatively, may include both new transmissions and HARQ retransmissions. In these examples, the predetermined number of symbols after the end of the PDCCH transmission 820, the beams of all CORESETs in the failed SCell may be set to the reported new candidate beam in the step 2 MAC-CE.

As described herein, when a gNB 802 transmits a BFR response 806 in response to a step 2 MAC-CE transmitted in the payload 808 of msgA 810 in a 2-step RACH procedure, the BFR response 806 may be clarified. A UE 804 may select between either of the aforementioned-aspects, given above, whichever arrives earlier.

In some aspects, when a gNB 802 transmits a BFR response 806 in response to a step 2 MAC-CE transmitted in the payload of msg3 in a 4-step RACH procedure, the BFR response can be clarified. For example, when a gNB 802 receives and decodes the payload of msgA in a 4-step RACH procedure, the gNB 802 may respond by transmitting a RAR that includes a msg4, which confirms the reception of the msgA payload. Here, when the UE 804 receives the msg4, the UE 804 may respond with an acknowledgment (ACK) indicating that the msg4 was received. Here, the UE 804 may take this msg4 transmission as explicit confirmation that the gNB 802 received the msgA payload. Here, the corresponding CORESET beam resetting time can follow one of two options. In a first option, after K symbols after the end of the ACK for the BFR response (e.g., msg4), the UE 804 may set the beams of all CORESETs in the failed SCell to the reported new candidate beam identified in the UE's transmission of the BFR request message. In a second option, after K symbols after the end of the BFR response (e.g., msg4), the UE 804 may set the beams of all CORESETs in the failed SCell to the reported new candidate beam identified in the UE's transmission of the BFR request message. That is, the counting of the K symbols may begin either at the end of msg4, or at the end of the ACK for msg4.

In some aspects, when a gNB 802 transmits a BFR response in response to a step 2 MAC-CE transmitted in the payload of msg3 in a 4-step RACH procedure, the BFR response can be clarified. For example, rather than transmitting a random access response, a gNB 802 may instead transmit a PDCCH scheduling DL or UL transmissions with a given HARQ process ID. Here, the PDCCH transmission can serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. In these examples, after K symbols after the end of the PDCCH transmission, the beams of all CORESETs in the failed SCell will be set to the reported new candidate beam in the step 2 MAC-CE.

In some aspects, when a gNB 802 transmits a BFR response in response to a step 2 MAC-CE transmitted in the payload of msg3 in a 4-step RACH procedure, the BFR response can be clarified. A UE 804 may select between either of the aforementioned-aspects, given above, whichever arrives earlier.

Figure 9:
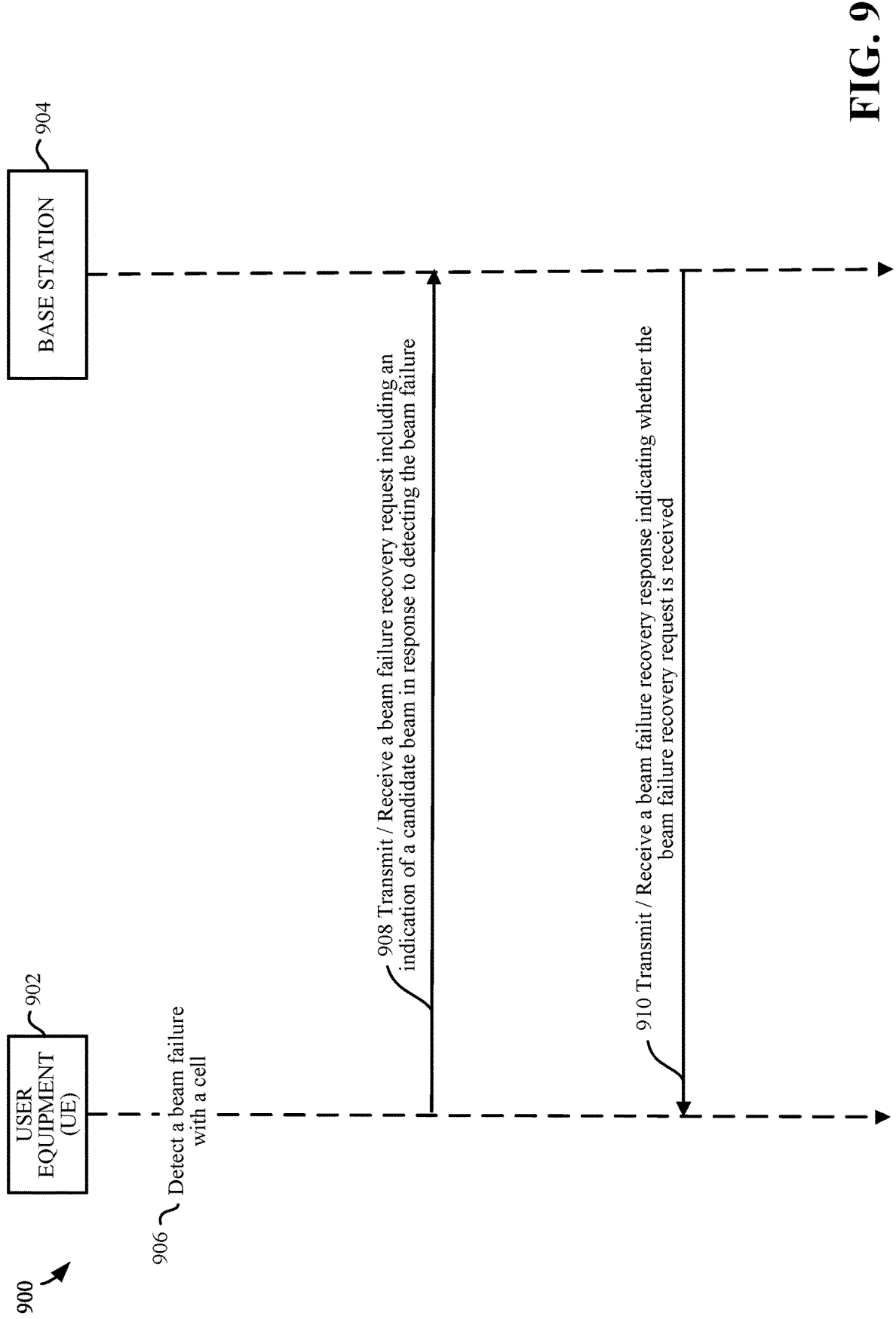
FIG. 9 is a conceptual signaling diagram illustrating an example environment for beam failure reporting according to some aspects.

FIG. 9 is a conceptual signaling diagram illustrating an example environment 900 for beam failure reporting according to some aspects. In the example shown in FIG. 9, a user equipment (UE) 902 is in wireless communication with a base station 904 over one or more wireless communication links. Each of the UE 902 and the base station 904 may correspond to any of the entities, gNodeBs, UEs, or the like as shown in FIGS. 1-4, 7, and 8.

At 906, the UE 902 may detect a beam failure with a cell. For example, a beam failure may correspond to a condition where a quality of a beam falls to an unacceptably low level. In some aspects, a UE 902 may consider a beam failure instance to occur when a measured quality of a downlink reference signal falls below a given threshold (e.g., a predetermined threshold). In some aspects, the UE 902 may utilize a measurement of a reference signal received power (RSRP) corresponding to a received CSI-RS or SSB. Once the UE 902 detects a given number (e.g., a predetermined number) of consecutive such beam failure instances, the UE 902 may then declare a beam failure. An example of a beam failure detection and recovery procedure may be defined in 3GPP TS 38.321 section 5.17, Release 15 and Release 16. Once a beam failure is detected, a UE 902 may initiate a beam failure recovery (BFR) procedure.

At 908, the UE 902 may transmit a beam failure recovery (BFR) request in response to detecting the beam failure. For example, upon detecting a beam failure, a UE 902 may search for a candidate beam to restore connectivity. The UE 902 may measure a quality (e.g., a RSRP) of one or more reference signals on a given set of candidate beams received from the base station 904. If the measured quality is greater than a certain threshold (e.g., a predetermined threshold), then that beam may be designated as a candidate beam and may be used to restore connectivity. Once the UE 902 identifies the candidate beam, the UE 902 may trigger the transmission of a beam failure recovery request informing the base station 904 that the UE 902 has detected a beam failure. In some aspects, the beam failure recovery request may include information identifying the candidate beam discovered by the UE 902 during the candidate beam search. In some aspects, the UE 902 may utilize a random access procedure for the transmission of the beam failure recovery request to the base station 904. For example, the UE 902 may implement a random access procedure by transmitting a random access preamble and a payload (msgA) to the base station 904. If the base station 904 detects the random access preamble and decodes the payload, the base station 904 may transmit a RAR or message B (msgB) to the UE 902.

In some aspects, the payload of the random access message (msgA) transmitted by the UE 902 may include information identifying the candidate beam. In some examples, each candidate beam may be associated with a specific random access preamble configuration. Accordingly, the base station 904 may receive the indication of the candidate beam identified by the UE 902 based on detecting the specific random access preamble configuration associated with the candidate beam. In some examples, the payload of the random access message transmitted by the UE 902 may be a medium access control (MAC) control element (MAC-CE) (e.g., a step 2 MAC-CE). In some aspects, a MAC-CE may refer to a series of steps in a beam failure recovery procedure implemented by the UE 902.

In some examples, the beam failure recovery request may be associated with a HARQ ID. For example, a base station 904 may receive, from the UE 902, a beam failure recovery request associated with a HARQ ID. In a 2-step RACH procedure, when the UE's 902 transmission of msgA is assigned or associated with a HARQ ID, then the base station 904 upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station 904 may associate or assign that HARQ ID of 0 to a corresponding PDCCH transmission.

At 910, the base station 904 may transmit a beam failure recovery response indicating whether the beam failure recovery request is received. In some aspects, when a base station 904 transmits a BFR response in response to a step 2 MAC-CE transmitted in the payload of msgA in a 2-step RACH procedure, the BFR response may be clarified. As a first example of clarifying the BFR response, when the base station 904 receives and decodes the payload of msgA from the UE 902 in a 2-step RACH procedure, the base station 904 may respond by transmitting a RAR that includes a SuccessRAR information element. In some aspects, when the UE 902 receives the SuccessRAR information element in the random access response as msgB, the UE 902 may respond with an acknowledgment (ACK) indicating that the BFR response message was received. Here, the UE 902 may take this SuccessRAR transmission as explicit confirmation that the base station 904 received the msgA payload. Further, the corresponding CORESET beam resetting time can follow one of two options. In a first option, following a predetermined number of symbols after the end of the ACK for the BFR response (e.g., msgB including SuccessRAR), the UE 902 may set the beams of all CORESETs in the failed SCell to the reported new candidate beam identified in the UE's transmission of the BFR request message. In a second option, following a predetermined number of symbols after the end of the BFR response (e.g., msgB including SuccessRAR), the UE 902 may set the beams of all CORESETs in the failed SCell to the reported new candidate beam identified in the UE's 902 transmission of the BFR request message. That is, the counting of the predetermined number of symbols may begin either at the end of msgB, or at the end of the ACK for msgB.

As a second example of clarifying the BFR response, in addition to or as an alternative to transmitting a random access response, the base station 904 may transmit a PDCCH scheduling DL or UL transmissions with a given HARQ process ID. Here, the PDCCH transmission may serve as the BFR response. When the UE's 902 transmission of msgA has an assigned or associated HARQ ID, then that HARQ ID may accordingly be assigned as the HARQ ID that the base station 904 assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions. In these examples, after a predetermined number of symbols after the end of the PDCCH transmission, the beams of all CORESETs in the failed SCell will be set to the reported new candidate beam in the step 2 MAC-CE. As a third example of clarifying the BFR response, a UE 902 may select between either the first example or the second example, given above, whichever arrives earlier.

In some aspects, when the base station 904 transmits a BFR response in response to a step 2 MAC-CE transmitted in the payload of msg3 in a 4-step RACH procedure, the BFR response may be clarified. As a first example of clarifying the BFR response, when a base station 904 receives and decodes the payload of msgA in a 4-step RACH procedure, the base station 904 may respond by transmitting a RAR that includes a msg4, which confirms the reception of the msgA payload. In some aspects, when the UE 902 receives the msg4, the UE 902 may respond with an acknowledgment (ACK) indicating that the msg4 was received. Here, the UE 902 may take this msg4 transmission as explicit confirmation that the base station 904 received the msgA payload. Here, the corresponding CORESET beam resetting time may follow one of two options. In a first option, following a predetermined number of symbols after the end of the ACK for the BFR response (e.g., msg4), the UE 902 may set the beams of all CORESETs in the failed SCell to the reported new candidate beam identified in the UE's 902 transmission of the BFR request message. In a second option, following a predetermined number of symbols after the end of the BFR response (e.g., msg4), the UE 902 may set the beams of all CORESETs in the failed SCell to the reported new candidate beam identified in the UE's 902 transmission of the BFR request message. That is, the counting of the predetermined number of symbols may begin either at the end of msg4, or at the end of the ACK for msg4.

As a second example of clarifying the BRF response, in addition to or as an alternative to transmitting a random access response, the base station 904 may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. In these examples, following a predetermined number of symbols after the end of the PDCCH transmission, the beams of all CORESETs in the failed SCell may be set to the reported new candidate beam in the step 2 MAC-CE. As a third example of clarifying the BFR response, a UE 902 may select between either the first example or the second example, given above, whichever arrives earlier.

Figure 10:
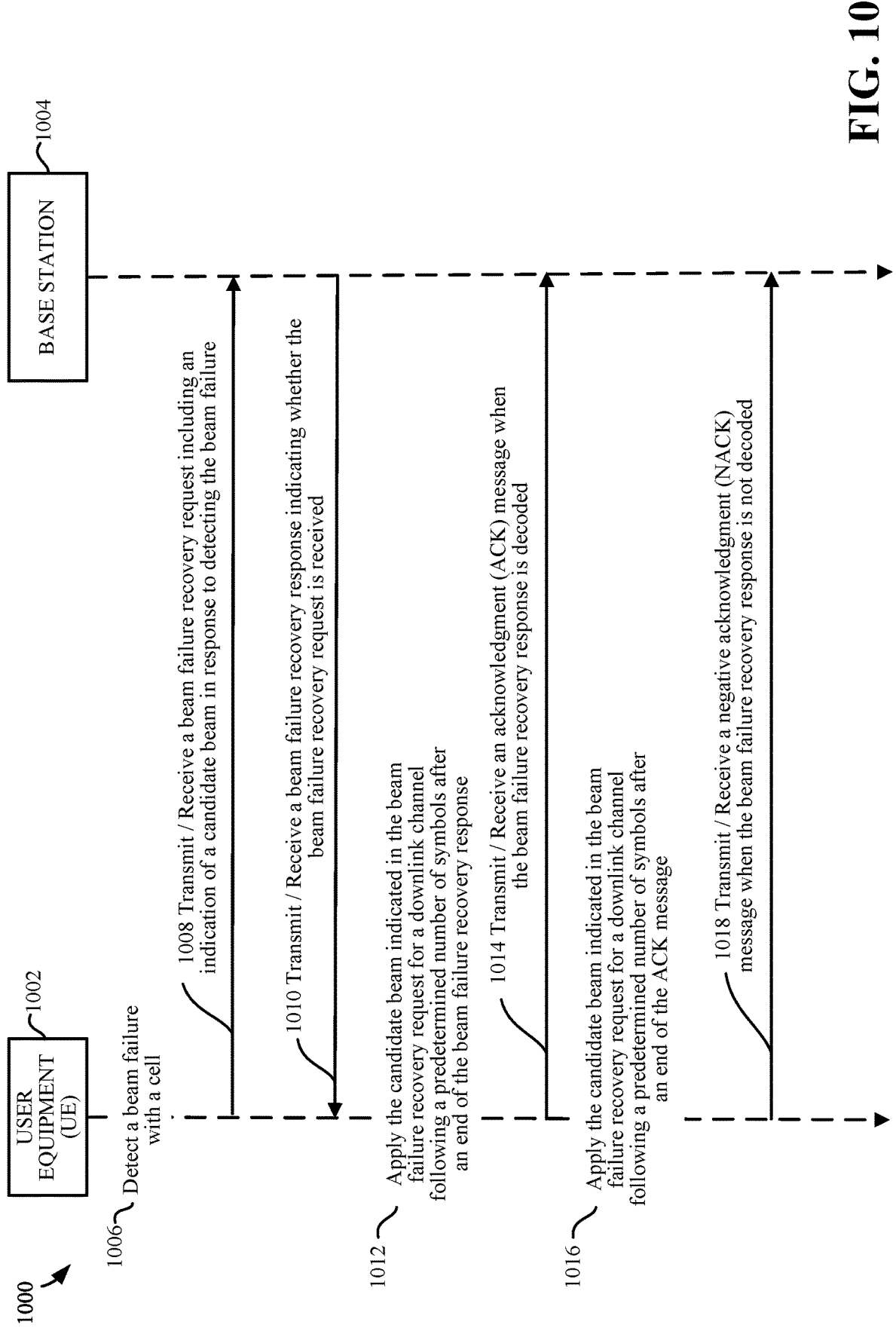
FIG. 10 is a conceptual signaling diagram illustrating an example environment for beam failure reporting according to some aspects.

FIG. 10 is a conceptual signaling diagram illustrating an example environment 1000 for beam failure reporting according to some aspects. In the example shown in FIG. 10, a user equipment (UE) 1002 is in wireless communication with a base station 1004 over one or more wireless communication links. Each of the UE 1002 and the base station 1004 may correspond to any of the entities, gNodeBs, UEs, or the like as shown in FIGS. 1-4 and 7-9.

At 1006, the UE 1002 may detect a beam failure with a cell. For example, a beam failure may correspond to a condition where a quality of a beam falls to an unacceptably low level. In some aspects, a UE 1002 may consider a beam failure instance to occur when a measured quality of a downlink reference signal falls below a given threshold (e.g., a predetermined threshold). In some aspects, the UE 1002 may utilize a measurement of a reference signal received power (RSRP) corresponding to a received CSI-RS or SSB. Once the UE 1002 detects a given number (e.g., a predetermined number) of consecutive such beam failure instances, the UE 1002 may then declare a beam failure. An example of a beam failure detection and recovery procedure may be defined in 3GPP TS 38.321 section 5.17, Release 15 and Release 16. Once a beam failure is detected, a UE 1002 may initiate a beam failure recovery (BFR) procedure.

At 1008, the UE 1002 may transmit a beam failure recovery (BFR) request in response to detecting the beam failure. For example, upon detecting a beam failure, a UE 1002 may search for a candidate beam to restore connectivity. The UE 1002 may measure a quality (e.g., a RSRP) of one or more reference signals on a given set of candidate beams received from the base station 1004. If the measured quality is greater than a certain threshold (e.g., a predetermined threshold), then that beam may be designated as a candidate beam and may be used to restore connectivity. Once the UE 1002 identifies the candidate beam, the UE 1002 may trigger the transmission of a beam failure recovery request informing the base station 1004 that the UE 1002 has detected a beam failure. In some aspects, the beam failure recovery request may include information identifying the candidate beam discovered by the UE 1002 during the candidate beam search. In some aspects, the UE 1002 may utilize a random access procedure for the transmission of the beam failure recovery request to the base station 1004. For example, the UE 1002 may implement a random access procedure by transmitting a random access preamble and a payload (msgA) to the base station 1004. If the base station 1004 detects the random access preamble and decodes the payload, the base station 1004 may transmits a RAR or message B (msgB) to the UE 1002.

In some aspects, the payload of the random access message (msgA) transmitted by the UE 1002 may include information identifying the candidate beam. In some examples, each candidate beam may be associated with a specific random access preamble configuration. Accordingly, the base station 1004 may receive the indication of the candidate beam identified by the UE 1002 based on detecting the specific random access preamble configuration associated with the candidate beam. In some examples, the payload of the random access message transmitted by the UE 1002 may be a medium access control (MAC) control element (MAC-CE) (e.g., a step 2 MAC-CE). In some aspects, a MAC-CE may refer to a series of steps in a beam failure recovery procedure implemented by the UE 1002.

In some examples, the beam failure recovery request may be associated with a HARQ ID. For example, a base station 1004 may receive, from the UE 1002, a beam failure recovery request associated with a HARQ ID. In a 2-step RACH procedure, when the UE's 1002 transmission of msgA is assigned or associated with a HARQ ID, then the base station 904 upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station 1004 may associate or assign that HARQ ID of 0 to a corresponding PDCCH transmission.

At 1010, the base station 1004 may transmit a beam failure recovery response indicating whether the beam failure recovery request is received. In some aspects, when a base station 1004 transmits a BFR response in response to a step 2 MAC-CE transmitted in the payload of msgA in a 2-step RACH procedure, the BFR response may be clarified. As a first example of clarifying the BFR response, when base station 1004 receives and decodes the payload of msgA from the UE 1002 in a 2-step RACH procedure, the base station 1004 may respond by transmitting a RAR that includes a SuccessRAR information element. In some aspects, when the UE 1002 receives the SuccessRAR information element in the RAR as msgB, the UE 1002 may respond with an acknowledgment (ACK) indicating that the BFR response message was received. Here, the UE 1002 may take this SuccessRAR transmission as explicit confirmation that the base station 1004 received the msgA payload. As a second example of clarifying the BFR response, in addition to or as an alternative to transmitting a RAR, the base station 1004 may transmit a PDCCH scheduling DL or UL transmissions with a given HARQ process ID. Here, the PDCCH transmission may serve as the BFR response. When the UE's 1002 transmission of msgA has an assigned or associated HARQ ID, then that HARQ ID may accordingly be assigned as the HARQ ID that the base station 1004 assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions.

In some aspects, when the base station 904 transmits a BFR response in response to a step 2 MAC-CE transmitted in the payload of msg3 in a 4-step RACH procedure, the BFR response may be clarified. As a first example of clarifying the BFR response, when a base station 904 receives and decodes the payload of msgA in a 4-step RACH procedure, the base station 904 may respond by transmitting a RAR that includes a msg4, which confirms the reception of the msgA payload. In some aspects, when the UE 902 receives the msg4, the UE 902 may respond with an ACK indicating that the msg4 was received. Here, the UE 902 may take this msg4 transmission as explicit confirmation that the base station 904 received the msgA payload. As a second example of clarifying the BRF response, in addition to or as an alternative to transmitting a RAR, the base station 904 may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions.

At 1012, the user equipment 1002 may apply the candidate beam indicated in the beam failure recovery request for a downlink control following a predetermined number of symbols after an end of the beam failure recovery response. In some aspects, in a 2-step RACH procedure, when base station 1004 receives and decodes the payload of msgA from the UE 1002 in a 2-step RACH procedure, the base station 1004 may respond by transmitting a RAR that includes a SuccessRAR information element. Subsequently, the UE 1002 may apply the candidate beam indicated in the beam failure recover request for a downlink control and may set the beams of all CORESETs in the failed SCell to the reported new candidate beam identified in the UE's 902 transmission of the BFR request message following a predetermined number of symbols after an end of the beam failure recovery response. That is, the counting of the predetermined number of symbols may begin at the end of msgB.

In some aspects, in a 2-step RACH procedure, the base station 1004 may transmit a PDCCH scheduling DL or UL transmissions with a given HARQ process ID. Here, the PDCCH transmission may serve as the BFR response. When the UE's 1002 transmission of msgA has an assigned or associated HARQ ID, then that HARQ ID may accordingly be assigned as the HARQ ID that the base station 904 assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions. Subsequently, following a predetermined number of symbols after the end of the PDCCH transmission, the user equipment 1002 may apply the candidate beam indicated in the beam failure recovery request for a downlink control and the beams of all CORESETs in the failed SCell will be reset to the reported new candidate beam in the step 2 MAC-CE.

In some aspects, in a 4-step RACH procedure, when the base station 1004 receives and decodes the payload of msgA in a 4-step RACH procedure, the base station 1004 may respond by transmitting a RAR that includes a msg4, which confirms the reception of the msgA payload. Subsequently, following a predetermined number of symbols after the end of the BFR response (e.g., msg4), the UE 1002 may apply the candidate beam indicated in the beam failure recovery request for a downlink control and reset the beams of all CORESETs in the failed SCell to the reported new candidate beam identified in the UE's 1002 transmission of the BFR request message. That is, the counting of the predetermined number of symbols may begin either at the end of msg4.

At 1014, the user equipment 1002 may transmit an ACK message when the beam failure recovery response is decoded. In some aspects, in a 2-step RACH procedure, when base station 1004 receives and decodes the payload of msgA from the UE 1002, the base station 1004 may respond by transmitting a RAR that includes a SuccessRAR information element. In some aspects, when the UE 1002 receives and decodes the SuccessRAR information element in the RAR as msgB, the UE 1002 may respond with an acknowledgment (ACK) indicating that the BFR response message was received. Here, the UE 1002 may take this SuccessRAR transmission as explicit confirmation that the base station 1004 received the msgA payload. In some aspects, in a 4-step RACH procedure, when the base station 1004 receives and decodes the payload of msgA, the base station 1004 may respond by transmitting a RAR that includes a msg4, which confirms the reception of the msgA payload. In some aspects, when the UE 1002 receives and decodes the msg4, the UE 1002 may respond with an acknowledgment (ACK) indicating that the msg4 was received. Here, the UE 1002 may take this msg4 transmission as explicit confirmation that the base station 1004 received the msgA payload.

At 1016, the user equipment 1002 may apply the candidate beam indicated in the beam failure recovery request for a downlink control following a predetermined number of symbols after an end of the acknowledgment (ACK) message. In some aspects, in a 2-step RACH procedure, when base station 1004 receives and decodes the payload of msgA from the UE 1002, the base station 1004 may respond by transmitting a RAR that includes a SuccessRAR information element. In some aspects, when the UE 1002 receives and decodes the SuccessRAR information element in the RAR as msgB, the UE 1002 may respond with an acknowledgment (ACK) indicating that the BFR response message was received. The UE 1002 may take the SuccessRAR transmission as explicit confirmation that the base station 1004 received the msgA payload. Subsequently, following a predetermined number of symbols after the end of the ACK for the BFR response (e.g., msgB including SuccessRAR), the UE 1002 may apply the candidate beam indicated in the beam failure recovery request for a downlink control and reset the beams of all CORESETs in the failed SCell to the reported new candidate beam identified in the UE's 1002 transmission of the BFR request message. That is, the counting of the predetermined number of symbols may begin at the end of the ACK for msgB.

In some aspects, in a 4-step RACH procedure, when the base station 1004 receives and decodes the payload of msgA, the base station 1004 may respond by transmitting a RAR that includes a msg4, which confirms the reception of the msgA payload. When the UE 1002 receives the msg4, the UE 1002 may respond with an ACK indicating that the msg4 was received. Here, the UE 1002 may take the msg4 transmission as explicit confirmation that the base station 1004 received the msgA payload. Subsequently, following a predetermined number of symbols after the end of the ACK for the BFR response (e.g., msg4), the UE 1002 may apply the candidate beam indicated in the beam failure recovery request for a downlink control and reset the beams of all CORESETs in the failed SCell to the reported new candidate beam identified in the UE's 1002 transmission of the BFR request message. That is, the counting of the predetermined number of symbols may begin at the end of the ACK for msg4.

At 1018, the user equipment 1002 may receive a negative acknowledgment (NACK) message when the beam failure recovery response is not decoded. In some aspects, in a 2-step RACH procedure, when base station 1004 receives and decodes the payload of msgA from the UE 1002, the base station 1004 may respond by transmitting a RAR that includes a SuccessRAR information element. In some aspects, when the UE 1002 receives the SuccessRAR information element in the RAR as msgB, the UE 1002 may be unable to decode the Success RAR information element. The UE 1002 may respond with a negative acknowledgment (NACK) indicating that the BFR response message was received, but not decoded. The UE 1002 may not apply the candidate beam indicated in the beam failure recovery request for a downlink control and may not reset the beams of all CORESETs in the failed SCell to the reported new candidate beam identified in the UE's 1002 transmission of the BFR request message. In some aspects, upon transmitting the NACK, the UE 1002 may apply the candidate beam indicated in the beam failure recovery request for a downlink control and may reset the beams of all CORESETs in the failed SCell to the reported new candidate beam identified in the UE's 1002 transmission of the BFR request message following a predetermined number of symbols after an end of the beam failure recovery response described herein.

In some aspects, in a 4-step RACH procedure, when the base station 1004 receives and decodes the payload of msgA, the base station 1004 may respond by transmitting a RAR that includes a msg4, which confirms the reception of the msgA payload. When the UE 1002 receives the msg4, the UE 1002 may be unable to decode the msg4. The UE 1002 may respond with a negative acknowledgment (NACK) indicating that the msg4 was received, but not decoded. The UE 1002 may not apply the candidate beam indicated in the beam failure recovery request for a downlink control and may not reset the beams of all CORESETs in the failed SCell to the reported new candidate beam identified in the UE's 1002 transmission of the BFR request message. In some aspects, upon transmitting the NACK, the UE 1002 may apply the candidate beam indicated in the beam failure recovery request for a downlink control and may reset the beams of all CORESETs in the failed SCell to the reported new candidate beam identified in the UE's 1002 transmission of the BFR request message following a predetermined number of symbols after an end of the beam failure recovery response described herein.

Figure 11:
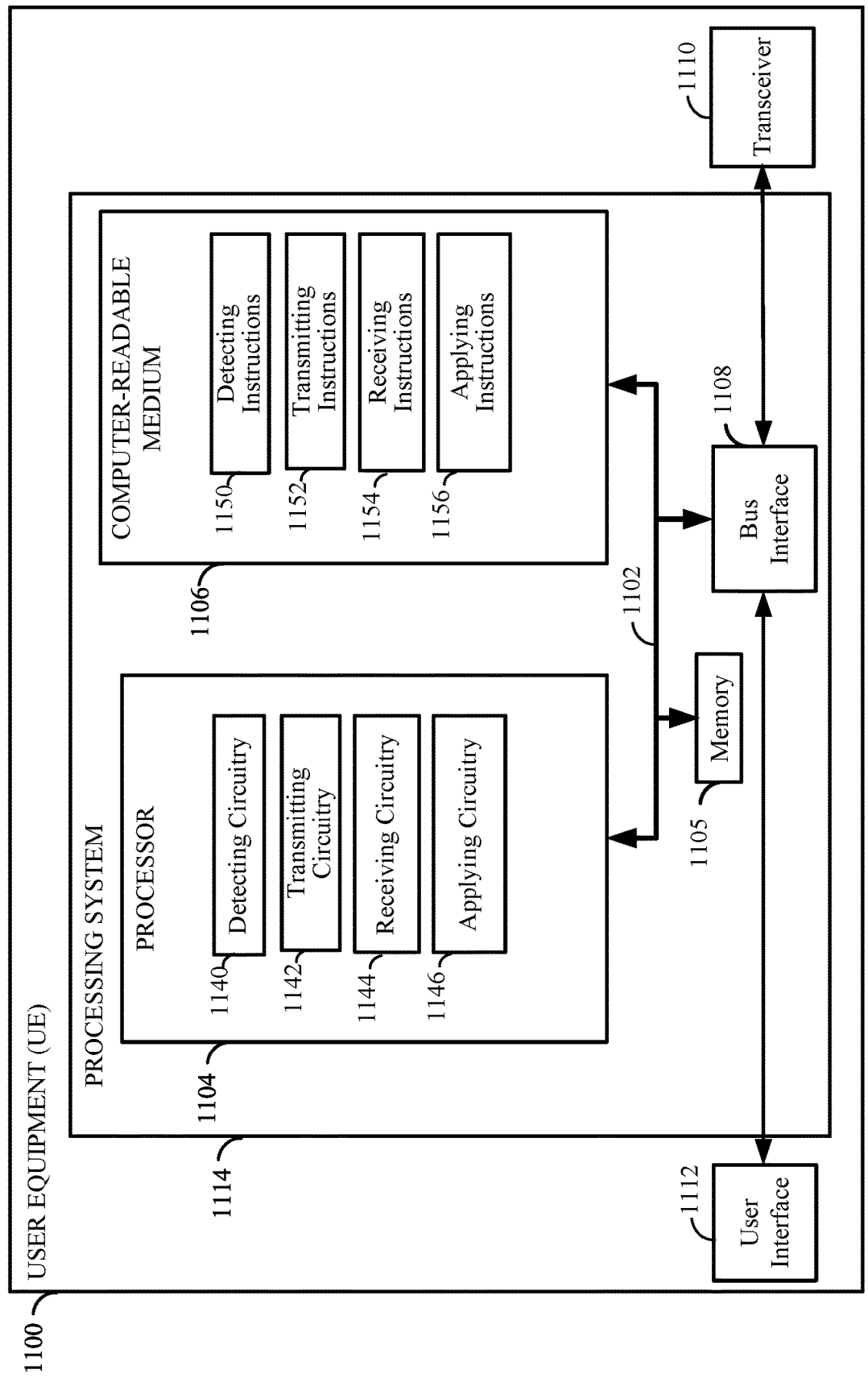
FIG. 11 is a block diagram conceptually illustrating an example of a hardware implementation for a user equipment (UE) according to some aspects of the disclosure.

FIG. 11 is a block diagram illustrating an example of a hardware implementation for a user equipment (UE) 1100 employing a processing system 1114. For example, the UE 1100 may be any of the user equipment (UEs) or base stations (e.g., gNB or eNB) illustrated in any one or more of FIGS. 1-4 and 7-10.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes described herein. The processor 1104 may in some instances be implemented via a baseband or modem chip and in other implementations, the processor 1104 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), and computer-readable media (represented generally by the computer-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). A user interface 1112 (e.g., keypad, display, speaker, microphone, joystick) may also be provided.

The processor 1104 is responsible for managing the bus 1102 and general processing, including the execution of software stored on the computer-readable storage medium 1106. The software, when executed by the processor 1104, causes the processing system 1114 to perform the various functions described herein for any particular apparatus. The computer-readable storage medium 1106 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1106.

The computer-readable storage medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1106 may reside in the processing system 1114, external to the processing system 1114, or distributed across multiple entities including the processing system 1114. The computer-readable storage medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include detecting circuitry 1140 configured to detecting a beam failure within a cell. The detecting circuitry 1140 may be configured to execute detecting instructions 1150 stored in the computer-readable storage medium 1106 to implement any of the one or more of the functions described herein. The processor 1104 may also include transmitting circuitry 1142 configured to transmit a beam failure recovery request including an indication of a candidate beam in response to detecting the beam failure. The transmitting circuitry 1142 may also be configured to transmit an acknowledgment (ACK) message when a beam failure recovery response is decoded. The transmitting circuitry 1142 may further be configured to transmit a negative acknowledgment (NACK) message when the beam failure recovery response is not decoded. The transmitting circuitry 1142 may be configured to execute transmitting instructions 1152 stored in the computer-readable storage medium 1106 to implement any of the one or more of the functions described herein.

The processor 1104 may further include receiving circuitry 1144 configured to receive a beam failure recovery response indicating whether the beam failure recovery request is received. The receiving circuitry 1144 may be configured to execute receiving instructions 1154 stored in the computer-readable storage medium 1106 to implement any of the one or more of the functions described herein. In addition, the processor 1104 may include applying circuitry 1146 configured to apply the candidate beam indicated in the beam failure recovery request for a downlink channel following a predetermined number of symbols after an end of the beam failure recovery response. The applying circuitry 1146 may also be configured to apply the candidate beam indicated in the beam failure recovery request for a downlink channel following a predetermined number of symbols after an end of the ACK message. The applying circuitry 1146 may be configured to execute applying instructions 1156 stored in the computer-readable storage medium 1106 to implement any of the one or more of the functions described herein.

Figure 12:
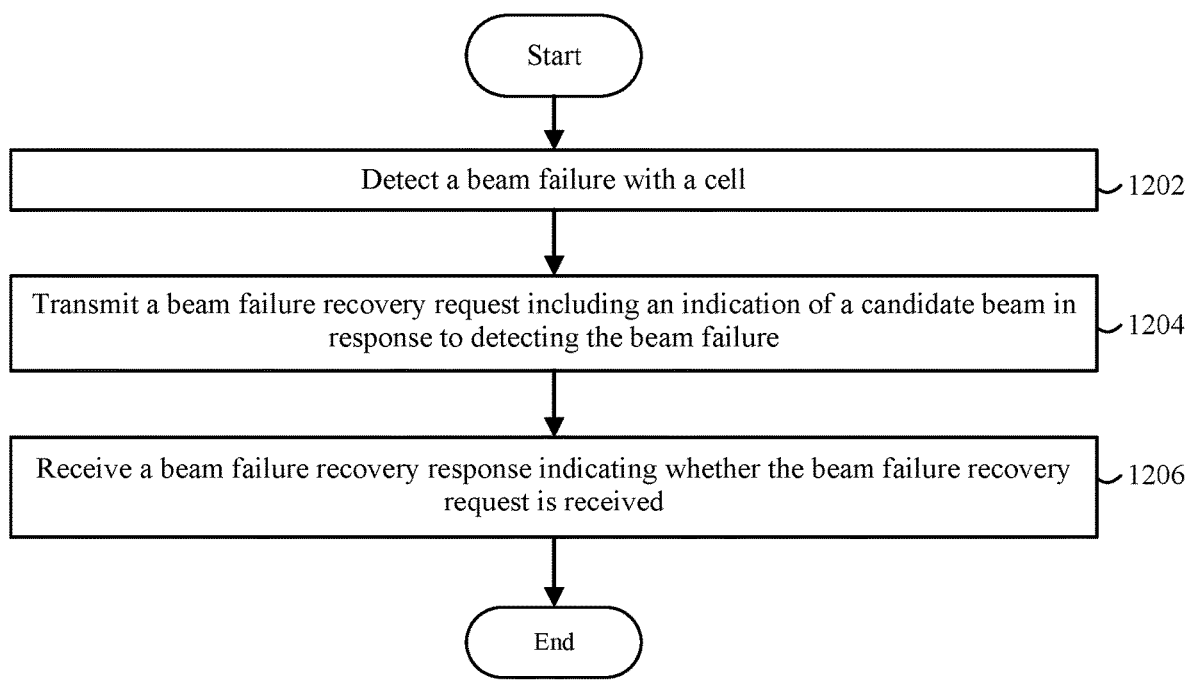
FIG. 12 is a flow chart of a method for beam failure reporting according to some aspects.

FIG. 12 is a flow chart 1200 of a method for beam failure reporting according to some aspects. As described below, some or all illustrated features may be omitted in a particular implementation within the scope of the present disclosure, and some illustrated features may not be required for implementation of all aspects. In some examples, the method may be performed by the UE 1100, as described above, and illustrated in FIG. 11, by a processor or processing system, or by any suitable means for carrying out the described functions.

At block 1202, the UE 1100 may detect a beam failure with a cell. For example, a beam failure may correspond to a condition where a quality of a beam falls to an unacceptably low level. In some aspects, a UE may consider a beam failure instance to occur when a measured quality of a downlink reference signal falls below a given threshold (e.g., a predetermined threshold). In some aspects, the UE may utilize a measurement of a reference signal received power (RSRP) corresponding to a received CSI-RS or SSB. Once the UE detects a given number (e.g., a predetermined number) of consecutive such beam failure instances, the UE may then declare a beam failure. An example of a beam failure detection and recovery procedure may be defined in 3GPP TS 38.321 section 5.17, Release 15 and Release 16. Once a beam failure is detected, a UE may initiate a beam failure recovery (BFR) procedure. For example, the detecting circuitry 1140, shown and described above in connection with FIG. 11 may provide a means to detect a beam failure with a cell.

At block 1204, the UE 1100 may transmit a beam failure recovery request in response to detecting the beam failure. For example, upon detecting a beam failure, a UE may search for a candidate beam to restore connectivity. The UE may measure a quality (e.g., a RSRP) of one or more reference signals on a given set of candidate beams received from the base station. If the measured quality is greater than a certain threshold (e.g., a predetermined threshold), then that beam may be designated as a candidate beam and may be used to restore connectivity. Once the UE identifies the candidate beam, the UE may trigger the transmission of a beam failure recovery request informing the base station that the UE has detected a beam failure. In some aspects, the beam failure recovery request may include information identifying the candidate beam discovered by the UE during the candidate beam search. In some aspects, the UE may utilize a random access procedure for the transmission of the beam failure recovery request to the base station. For example, the UE may implement a random access procedure by transmitting a random access preamble and a payload (msgA) to the base station. If the base station detects the random access preamble and decodes the payload, the base station may transmits a RAR or message B (msgB) to the UE.

In some aspects, the payload of the random access message (msgA) transmitted by the UE may include information identifying the candidate beam. In some examples, each candidate beam may be associated with a specific random access preamble configuration. Accordingly, the base station may receive the indication of the candidate beam identified by the UE based on detecting the specific random access preamble configuration associated with the candidate beam. In some examples, the payload of the random access message transmitted by the UE may be a medium access control (MAC) control element (MAC-CE) (e.g., a step 2 MAC-CE). In some aspects, a MAC-CE may refer to a series of steps in a beam failure recovery procedure implemented by the UE.

In some examples, the beam failure recovery request may be associated with a hybrid automatic repeat request (HARQ) identification (ID). For example, a base station may receive, from the UE, a beam failure recovery request associated with a HARQ ID. In a 2-step RACH procedure, when the UE's transmission of msgA is assigned or associated with a HARQ ID, then the base station upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station may associate or assign that HARQ ID of 0 to a corresponding PDCCH transmission. For example, the transmitting circuitry 1142 together with the transceiver 1110, shown and described above in connection with FIG. 11 may provide a means to transmit a beam failure recovery request in response to detecting the beam failure.

At block 1206, the UE 1100 may receive a beam failure recovery response indicating whether the beam failure recovery request is received. In some aspects, when a base station transmits a BFR response in response to a step 2 MAC-CE transmitted in the payload of msgA in a 2-step RACH procedure, the BFR response may be clarified. As a first example of clarifying the BFR response, when base station receives and decodes the payload of msgA from the UE in a 2-step RACH procedure, the base station may respond by transmitting a RAR that includes a SuccessRAR information element. In some aspects, when the UE receives the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. Further, the corresponding CORESET beam resetting time can follow one of two options. In a first option, following a predetermined number of symbols after the end of the ACK for the BFR response (e.g., msgB including SuccessRAR), the UE may set the beams of all CORESETs in the failed SCell to the reported new candidate beam identified in the UE's transmission of the BFR request message. In a second option, following a predetermined number of symbols after the end of the BFR response (e.g., msgB including SuccessRAR), the UE may set the beams of all CORESETs in the failed SCell to the reported new candidate beam identified in the UE's transmission of the BFR request message. That is, the counting of the predetermined number of symbols may begin either at the end of msgB, or at the end of the ACK for msgB.

As a second example of clarifying the BFR response, in addition to or as an alternative to transmitting a RAR, the base station may transmit a PDCCH scheduling DL or UL transmissions with a given HARQ process ID. Here, the PDCCH transmission may serve as the BFR response. When the UE's transmission of msgA has an assigned or associated HARQ ID, then that HARQ ID may accordingly be assigned as the HARQ ID that the base station assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions. In these examples, after a predetermined number of symbols after the end of the PDCCH transmission, the beams of all CORESETs in the failed SCell will be set to the reported new candidate beam in the step 2 MAC-CE. As a third example of clarifying the BFR response, a UE may select between either the first example or the second example, given above, whichever arrives earlier.

In some aspects, when the base station transmits a BFR response in response to a step 2 MAC-CE transmitted in the payload of msg3 in a 4-step RACH procedure, the BFR response may be clarified. As a first example of clarifying the BFR response, when a base station receives and decodes the payload of msgA in a 4-step RACH procedure, the base station may respond by transmitting a RAR that includes a msg4, which confirms the reception of the msgA payload. In some aspects, when the UE receives the msg4, the UE may respond with an acknowledgment (ACK) indicating that the msg4 was received. Here, the UE may take this msg4 transmission as explicit confirmation that the base station received the msgA payload. Here, the corresponding CORESET beam resetting time may follow one of two options. In a first option, following a predetermined number of symbols after the end of the ACK for the BFR response (e.g., msg4), the UE may set the beams of all CORESETs in the failed SCell to the reported new candidate beam identified in the UE's transmission of the BFR request message. In a second option, following a predetermined number of symbols after the end of the BFR response (e.g., msg4), the UE may set the beams of all CORESETs in the failed SCell to the reported new candidate beam identified in the UE's transmission of the BFR request message. That is, the counting of the predetermined number of symbols may begin either at the end of msg4, or at the end of the ACK for msg4.

As a second example of clarifying the BRF response, in addition to or as an alternative to transmitting a RAR, the base station may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. In these examples, following a predetermined number of symbols after the end of the PDCCH transmission, the beams of all CORESETs in the failed SCell may be set to the reported new candidate beam in the step 2 MAC-CE. As a third example of clarifying the BFR response, a UE may select between either the first example or the second example, given above, whichever arrives earlier. For example, the receiving circuitry 1144 together with the transceiver 1110, shown and described above in connection with FIG. 11 may provide a means to receive a beam failure recovery response indicating whether the beam failure recovery request is received.

Figure 13:
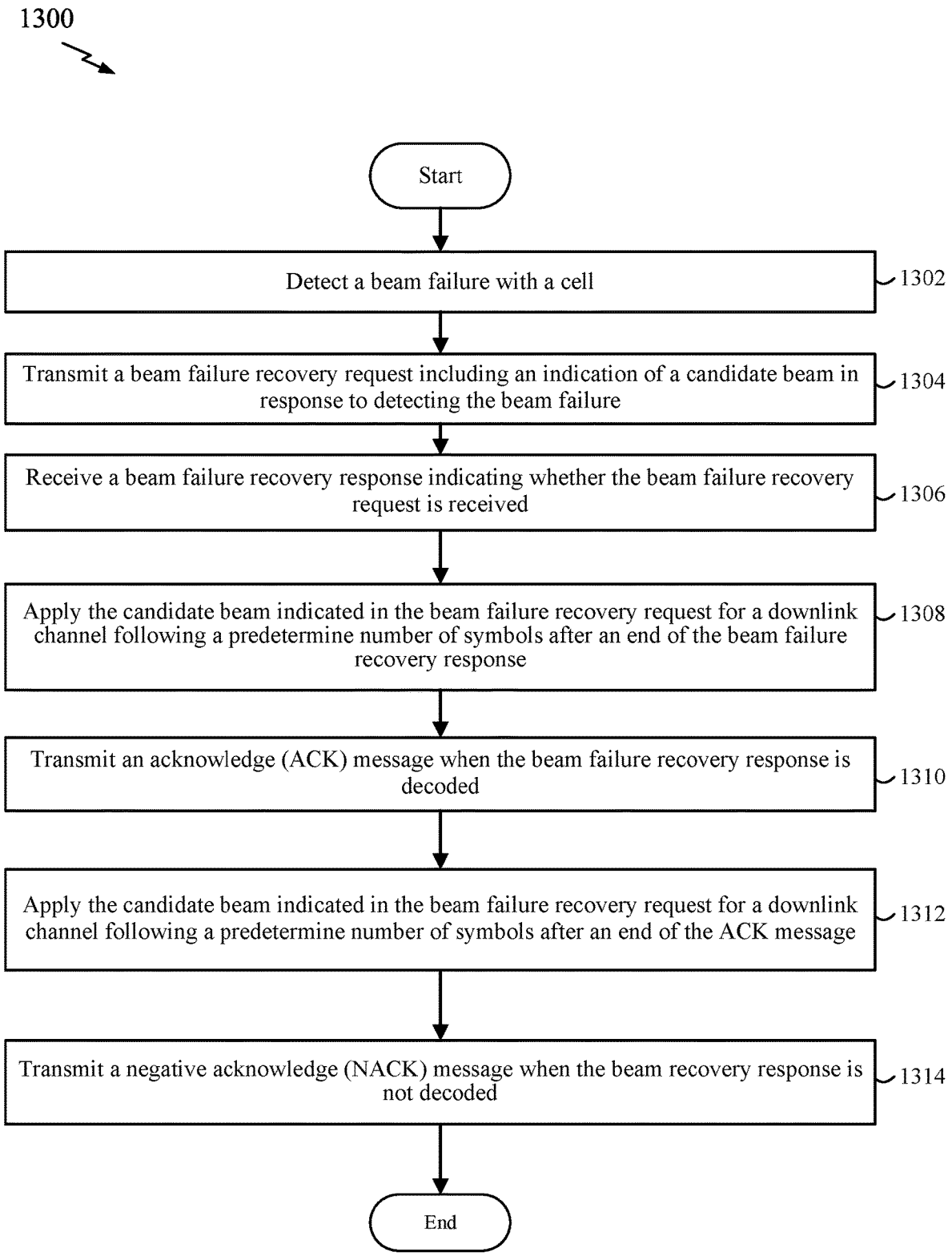
FIG. 13 is a flow chart of a method for beam failure reporting according to some aspects.

FIG. 13 is a flow chart 1300 of a method for beam failure reporting according to some aspects. As described below, some or all illustrated features may be omitted in a particular implementation within the scope of the present disclosure, and some illustrated features may not be required for implementation of all aspects. In some examples, the method may be performed by the UE 1100, as described above, and illustrated in FIG. 11, by a processor or processing system, or by any suitable means for carrying out the described functions.

At block 1302, the UE 1100 may detect a beam failure with a cell. For example, a beam failure may correspond to a condition where a quality of a beam falls to an unacceptably low level. In some aspects, a UE may consider a beam failure instance to occur when a measured quality of a downlink reference signal falls below a given threshold (e.g., a predetermined threshold). In some aspects, the UE may utilize a measurement of a reference signal received power (RSRP) corresponding to a received CSI-RS or SSB. Once the UE detects a given number (e.g., a predetermined number) of consecutive such beam failure instances, the UE may then declare a beam failure. An example of a beam failure detection and recovery procedure may be defined in 3GPP TS 38.321 section 5.17, Release 15 and Release 16. Once a beam failure is detected, a UE may initiate a beam failure recovery (BFR) procedure. For example, the detecting circuit 1140, shown and described above in connection with FIG. 11 may provide a means to detect a beam failure with a cell.

At block 1304, the UE 1100 may transmit a beam failure recovery request in response to detecting the beam failure. For example, upon detecting a beam failure, a UE may search for a candidate beam to restore connectivity. The UE may measure a quality (e.g., a RSRP) of one or more reference signals on a given set of candidate beams received from the base station. If the measured quality is greater than a certain threshold (e.g., a predetermined threshold), then that beam may be designated as a candidate beam and may be used to restore connectivity. Once the UE identifies the candidate beam, the UE may trigger the transmission of a beam failure recovery request informing the base station that the UE has detected a beam failure. In some aspects, the beam failure recovery request may include information identifying the candidate beam discovered by the UE during the candidate beam search. In some aspects, the UE may utilize a random access procedure for the transmission of the beam failure recovery request to the base station. For example, the UE may implement a random access procedure by transmitting a random access preamble and a payload (msgA) to the base station. If the base station detects the random access preamble and decodes the payload, the base station may transmits a RAR or message B (msgB) to the UE.

In some aspects, the payload of the random access message (msgA) transmitted by the UE may include information identifying the candidate beam. In some examples, each candidate beam may be associated with a specific random access preamble configuration. Accordingly, the base station may receive the indication of the candidate beam identified by the UE based on detecting the specific random access preamble configuration associated with the candidate beam. In some examples, the payload of the random access message transmitted by the UE may be a medium access control (MAC) control element (MAC-CE) (e.g., a step 2 MAC-CE). In some aspects, a MAC-CE may refer to a series of steps in a beam failure recovery procedure implemented by the UE.

In some examples, the beam failure recovery request may be associated with a hybrid automatic repeat request (HARQ) identification (ID). For example, a base station may receive, from the UE, a beam failure recovery request associated with a HARQ ID. In a 2-step RACH procedure, when the UE's transmission of msgA is assigned or associated with a HARQ ID, then the base station upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station may associate or assign that HARQ ID of 0 to a corresponding PDCCH transmission. For example, the transmitting circuitry 1142 together with the transceiver 1110, shown and described above in connection with FIG. 11 may provide a means to transmit a beam failure recovery request in response to detecting the beam failure.

At block 1306, the UE 1100 may receive a beam failure recovery response indicating whether the beam failure recovery request is received. In some aspects, when a base station transmits a BFR response in response to a step 2 MAC-CE transmitted in the payload of msgA in a 2-step RACH procedure, the BFR response may be clarified. As a first example of clarifying the BFR response, when base station receives and decodes the payload of msgA from the UE in a 2-step RACH procedure, the base station may respond by transmitting a RAR that includes a SuccessRAR information element. In some aspects, when the UE receives the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. As a second example of clarifying the BFR response, in addition to or as an alternative to transmitting a RAR, the base station may transmit a PDCCH scheduling DL or UL transmissions with a given HARQ process ID. Here, the PDCCH transmission may serve as the BFR response. When the UE's transmission of msgA has an assigned or associated HARQ ID, then that HARQ ID may accordingly be assigned as the HARQ ID that the base station assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions.

In some aspects, when the base station transmits a BFR response in response to a step 2 MAC-CE transmitted in the payload of msg3 in a 4-step RACH procedure, the BFR response may be clarified. As a first example of clarifying the BFR response, when a base station receives and decodes the payload of msgA in a 4-step RACH procedure, the base station may respond by transmitting a RAR that includes a msg4, which confirms the reception of the msgA payload. In some aspects, when the UE receives the msg4, the UE may respond with an acknowledgment (ACK) indicating that the msg4 was received. Here, the UE may take this msg4 transmission as explicit confirmation that the base station received the msgA payload. As a second example of clarifying the BRF response, in addition to or as an alternative to transmitting a RAR, the base station may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. For example, the receiving circuitry 1144 together with the transceiver 1110, shown and described above in connection with FIG. 11 may provide a means to receive a beam failure recovery response indicating whether the beam failure recovery request is received.

At block 1308, the UE 1100 may apply the candidate beam indicated in the beam failure recovery request for a downlink channel following a predetermined number of symbols after an end of the beam failure recovery response. In some aspects, in a 2-step RACH procedure, when base station receives and decodes the payload of msgA from the UE in a 2-step RACH procedure, the base station may respond by transmitting a RAR that includes a SuccessRAR information element. Subsequently, the UE may apply the candidate beam indicated in the beam failure recover request for a downlink control and may set the beams of all CORESETs in the failed SCell to the reported new candidate beam identified in the UE's transmission of the BFR request message following a predetermined number of symbols after an end of the beam failure recovery response. That is, the counting of the predetermined number of symbols may begin at the end of msgB.

In some aspects, in a 2-step RACH procedure, the base station may transmit a PDCCH scheduling DL or UL transmissions with a given HARQ process ID. Here, the PDCCH transmission may serve as the BFR response. When the UE's transmission of msgA has an assigned or associated HARQ ID, then that HARQ ID may accordingly be assigned a HARQ ID that the base station assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions. Subsequently, following a predetermined number of symbols after the end of the PDCCH transmission, the user equipment may apply the candidate beam indicated in the beam failure recovery request for a downlink control and the beams of all CORESETs in the failed SCell will be reset to the reported new candidate beam in the step 2 MAC-CE.

In some aspects, in a 4-step RACH procedure, when the base station receives and decodes the payload of msgA in a 4-step RACH procedure, the base station may respond by transmitting a RAR that includes a msg4, which confirms the reception of the msgA payload. Subsequently, following a predetermined number of symbols after the end of the BFR response (e.g., msg4), the UE may apply the candidate beam indicated in the beam failure recovery request for a downlink control and reset the beams of all CORESETs in the failed SCell to the reported new candidate beam identified in the UE's transmission of the BFR request message. That is, the counting of the predetermined number of symbols may begin either at the end of msg4. For example, the applying circuitry 1146, shown and described above in connection with FIG. 11 may provide a means to apply the candidate beam indicated in the beam failure recovery request for a downlink channel following a predetermined number of symbols after an end of the beam failure recovery response.

At block 1310, the UE 1100 may transmit an acknowledgment (ACK) message when the beam failure recovery response is decoded. In some aspects, in a 2-step RACH procedure, when base station receives and decodes the payload of msgA from the UE, the base station may respond by transmitting a RAR that includes a SuccessRAR information element. In some aspects, when the UE receives and decodes the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. In some aspects, in a 4-step RACH procedure, when the base station receives and decodes the payload of msgA, the base station may respond by transmitting a RAR that includes a msg4, which confirms the reception of the msgA payload. In some aspects, when the UE receives and decodes the msg4, the UE may respond with an acknowledgment (ACK) indicating that the msg4 was received. Here, the UE may take this msg4 transmission as explicit confirmation that the base station received the msgA payload. For example, the transmitting circuitry 1142 together with the transceiver 1110, shown and described above in connection with FIG. 11 may provide a means to transmit an acknowledgment (ACK) message when the beam failure recovery response is decoded.

At block 1312, the UE 1100 may apply the candidate beam indicated in the beam failure recovery request for a downlink channel following a predetermined number of symbols after an end of the ACK message. In some aspects, in a 2-step RACH procedure, when base station receives and decodes the payload of msgA from the UE, the base station may respond by transmitting a RAR that includes a SuccessRAR information element. In some aspects, when the UE receives and decodes the SuccessRAR information element in the RAR as msgB, the UE may respond with an acknowledgment (ACK) indicating that the BFR response message was received. The UE may take the SuccessRAR transmission as explicit confirmation that the base station received the msgA payload. Subsequently, following a predetermined number of symbols after the end of the ACK for the BFR response (e.g., msgB including SuccessRAR), the UE may apply the candidate beam indicated in the beam failure recovery request for a downlink control and reset the beams of all CORESETs in the failed SCell to the reported new candidate beam identified in the UE's transmission of the BFR request message. That is, the counting of the predetermined number of symbols may begin at the end of the ACK for msgB.

In some aspects, in a 4-step RACH procedure, when the base station receives and decodes the payload of msgA, the base station may respond by transmitting a RAR that includes a msg4, which confirms the reception of the msgA payload. When the UE receives the msg4, the UE may respond with an acknowledgment (ACK) indicating that the msg4 was received. Here, the UE may take the msg4 transmission as explicit confirmation that the base station received the msgA payload. Subsequently, following a predetermined number of symbols after the end of the ACK for the BFR response (e.g., msg4), the UE may apply the candidate beam indicated in the beam failure recovery request for a downlink control and reset the beams of all CORESETs in the failed SCell to the reported new candidate beam identified in the UE's transmission of the BFR request message. That is, the counting of the predetermined number of symbols may begin at the end of the ACK for msg4. For example, the applying circuitry 1146, shown and described above in connection with FIG. 11 may provide a means to apply the candidate beam indicated in the beam failure recovery request for a downlink channel following a predetermined number of symbols after an end of the ACK message.

At block 1314, the UE 1100 may transmit a negative acknowledgment (NACK) message when the beam recovery response is not decoded. In some aspects, in a 2-step RACH procedure, when base station receives and decodes the payload of msgA from the UE, the base station may respond by transmitting a RAR that includes a SuccessRAR information element. In some aspects, when the UE receives the SuccessRAR information element in the RAR as msgB, the UE may be unable to decode the Success RAR information element. The UE may respond with a negative acknowledgment (NACK) indicating that the BFR response message was received, but not decoded. The UE may not apply the candidate beam indicated in the beam failure recovery request for a downlink control and may not reset the beams of all CORESETs in the failed SCell to the reported new candidate beam identified in the UE's transmission of the BFR request message. In some aspects, upon transmitting the NACK, the UE may apply the candidate beam indicated in the beam failure recovery request for a downlink control and may reset the beams of all CORESETs in the failed SCell to the reported new candidate beam identified in the UE's transmission of the BFR request message following a predetermined number of symbols after an end of the beam failure recovery response described herein.

In some aspects, in a 4-step RACH procedure, when the base station receives and decodes the payload of msgA, the base station may respond by transmitting a RAR that includes a msg4, which confirms the reception of the msgA payload. When the UE receives the msg4, the UE may be unable to decode the msg4. The UE may respond with a negative acknowledgment (NACK) indicating that the msg4 was received, but not decoded. The UE may not apply the candidate beam indicated in the beam failure recovery request for a downlink control and may not reset the beams of all CORESETs in the failed SCell to the reported new candidate beam identified in the UE's transmission of the BFR request message. In some aspects, upon transmitting the NACK, the UE may apply the candidate beam indicated in the beam failure recovery request for a downlink control and may reset the beams of all CORESETs in the failed SCell to the reported new candidate beam identified in the UE's transmission of the BFR request message following a predetermined number of symbols after an end of the beam failure recovery response described herein. For example, the transmitting circuitry 1142 together with the transceiver 1110, shown and described above in connection with FIG. 11 may provide a means to transmit a negative acknowledgment (NACK) message when the beam recovery response is not decoded.

In one configuration, the UE 1100 includes means for performing the various functions and processes described in relation to FIGS. 12 and 13. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-4 and 7-11 and utilizing, for example, the processes and/or algorithms described herein in relation to FIGS. 12 and 13.

Figure 14:
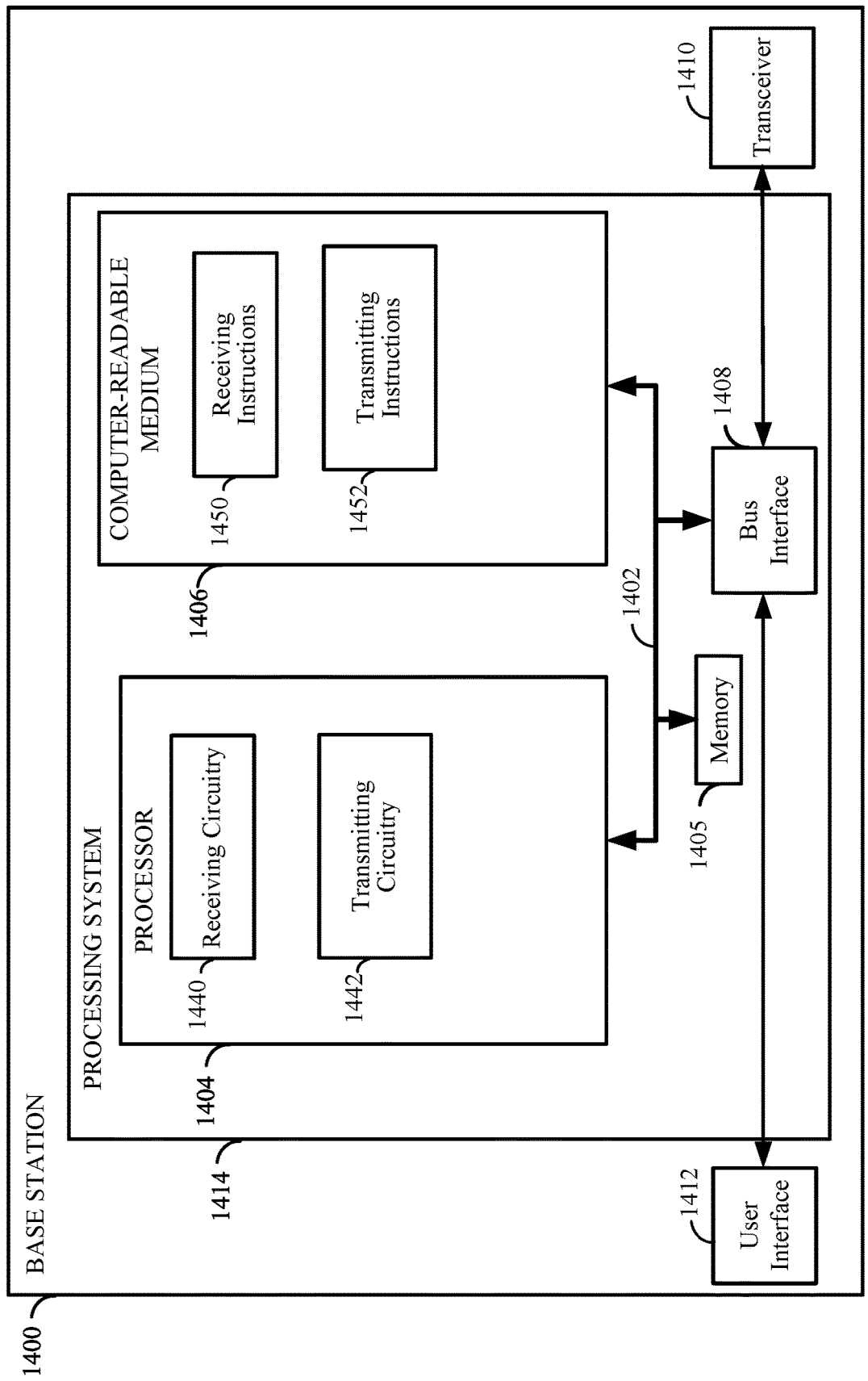
FIG. 14 is a block diagram conceptually illustrating an example of a hardware implementation for a base station according to some aspects of the disclosure.

FIG. 14 is a block diagram illustrating an example of a hardware implementation for a base station 1400 employing a processing system 1414 according to some aspects. For example, the base station 1400 may correspond to any of the devices or systems shown and described herein in any one or more of FIGS. 1-4 and 7-10.

In accordance with various aspects of the disclosure, an element, or any portion of an element, or any combination of elements may be implemented with a processing system 1414 that includes one or more processors 1404. The processing system 1414 may be substantially the same as the processing system 1114 illustrated in FIG. 11, including a bus interface 1408, a bus 1402, a processor 1404, and a computer-readable storage medium 1406. Furthermore, the base station 1400 may include a user interface 1412 and a transceiver 1410 substantially similar to those described above in FIG. 11. That is, the processor 1404, as utilized in the base station 1400, may be used to implement any one or more of the processes described herein.

In some aspects of the disclosure, the processor 1404 may include circuitry configured for various functions. For example, the processor 1404 may include receiving circuitry 1340 configured to receive a beam failure recovery request including an indication of a candidate beam in response to the detection of a beam failure. The receiving circuitry 1340 may also be configured to receive an acknowledgment (ACK) message when a beam failure recovery request is decoded. The receiving circuitry 1340 may further be configured to receive a negative acknowledgment (NACK) message when a beam failure recovery request is not decoded.

The receiving circuitry 1440 may be configured to execute receiving instructions 1450 stored in the computer-readable storage medium 1406 to implement any of the one or more of the functions described herein.

The processor 1404 may also include transmitting circuitry 1442 configured to transmit a beam failure recovery response indicating whether the beam failure recovery is received. The transmitting circuitry 1442 may further be configured to execute transmitting instructions 1452 stored in the computer-readable storage medium 1406 to implement any of the one or more of the functions described herein.

Figure 15:
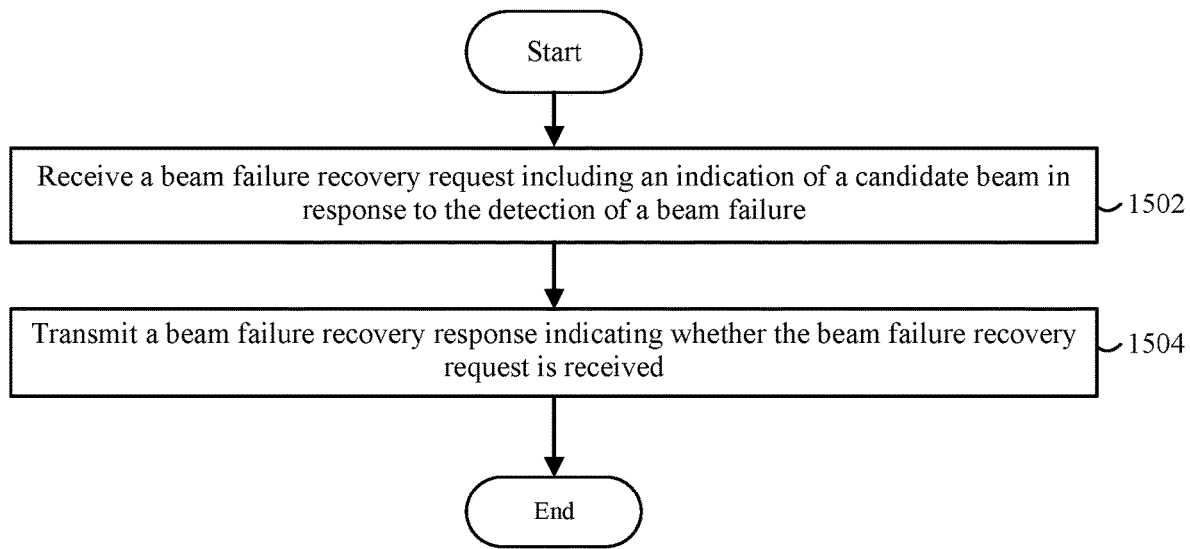
FIG. 15 is a flow chart of a method for beam failure reporting according to some aspects.

FIG. 15 is a flow chart 1200 of a method for beam failure reporting according to some aspects. As described below, some or all illustrated features may be omitted in a particular implementation within the scope of the present disclosure, and some illustrated features may not be required for implementation of all aspects. In some examples, the method may be performed by the base station 1400, as described above, and illustrated in FIG. 14, by a processor or processing system, or by any suitable means for carrying out the described functions.

At block 1502, the base station 1400 may receive a beam failure recovery request including an indication of a candidate beam in response to a detection of a beam failure. For example, the UE may detect a beam failure with a cell. For example, a beam failure may correspond to a condition where a quality of a beam falls to an unacceptably low level. In some aspects, a UE may consider a beam failure instance to occur when a measured quality of a downlink reference signal falls below a given threshold (e.g., a predetermined threshold). In some aspects, the UE may utilize a measurement of a reference signal received power (RSRP) corresponding to a received CSI-RS or SSB. Once the UE detects a given number (e.g., a predetermined number) of consecutive such beam failure instances, the UE may then declare a beam failure. An example of a beam failure detection and recovery procedure may be defined in 3GPP TS 38.321 section 5.17, Release 15 and Release 16. Once a beam failure is detected, a UE may initiate a beam failure recovery (BFR) procedure.

Upon detecting a beam failure, a UE may search for a candidate beam to restore connectivity. The UE may measure a quality (e.g., a RSRP) of one or more reference signals on a given set of candidate beams received from the base station. If the measured quality is greater than a certain threshold (e.g., a predetermined threshold), then that beam may be designated as a candidate beam and may be used to restore connectivity. Once the UE identifies the candidate beam, the UE may trigger the transmission of a beam failure recovery request informing the base station that the UE has detected a beam failure. In some aspects, the beam failure recovery request may include information identifying the candidate beam discovered by the UE during the candidate beam search. In some aspects, the UE may utilize a random access procedure for the transmission of the beam failure recovery request to the base station. For example, the UE may implement a random access procedure by transmitting a random access preamble and a payload (msgA) to the base station. If the base station detects the random access preamble and decodes the payload, the base station may transmits a RAR or message B (msgB) to the UE.

In some aspects, the payload of the random access message (msgA) transmitted by the UE may include information identifying the candidate beam. In some examples, each candidate beam may be associated with a specific random access preamble configuration. Accordingly, the base station may receive the indication of the candidate beam identified by the UE based on detecting the specific random access preamble configuration associated with the candidate beam. In some examples, the payload of the random access message transmitted by the UE may be a medium access control (MAC) control element (MAC-CE) (e.g., a step 2 MAC-CE). In some aspects, a MAC-CE may refer to a series of steps in a beam failure recovery procedure implemented by the UE.

In some examples, the beam failure recovery request may be associated with a hybrid automatic repeat request (HARQ) identification (ID). For example, a base station may receive, from the UE, a beam failure recovery request associated with a HARQ ID. In a 2-step RACH procedure, when the UE's transmission of msgA is assigned or associated with a HARQ ID, then the base station upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station may associate or assign that HARQ ID of 0 to a corresponding PDCCH transmission. For example, the receiving circuitry 1440 together with the transceiver 1410, shown and described above in connection with FIG. 14 may provide a means to receive a beam failure recovery request including an indication of a candidate beam in response to a detection of a beam failure.

At block 1504, the base station 1400 may transmit a beam failure recovery response indicating whether the beam failure recovery request is received. In some aspects, when a base station transmits a BFR response in response to a step 2 MAC-CE transmitted in the payload of msgA in a 2-step RACH procedure, the BFR response may be clarified. As a first example of clarifying the BFR response, when base station receives and decodes the payload of msgA from the UE in a 2-step RACH procedure, the base station may respond by transmitting a RAR that includes a SuccessRAR information element. In some aspects, when the UE receives the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. Further, the corresponding CORESET beam resetting time can follow one of two options. In a first option, following a predetermined number of symbols after the end of the ACK for the BFR response (e.g., msgB including SuccessRAR), the UE may set the beams of all CORESETs in the failed SCell to the reported new candidate beam identified in the UE's transmission of the BFR request message. In a second option, following a predetermined number of symbols after the end of the BFR response (e.g., msgB including SuccessRAR), the UE may set the beams of all CORESETs in the failed SCell to the reported new candidate beam identified in the UE's transmission of the BFR request message. That is, the counting of the predetermined number of symbols may begin either at the end of msgB, or at the end of the ACK for msgB.

As a second example of clarifying the BFR response, in addition to or as an alternative to transmitting a RAR, the base station may transmit a PDCCH scheduling DL or UL transmissions with a given HARQ process ID. Here, the PDCCH transmission may serve as the BFR response. When the UE's transmission of msgA has an assigned or associated HARQ ID, then that HARQ ID may accordingly be assigned as the HARQ ID that the base station assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions. In these examples, after a predetermined number of symbols after the end of the PDCCH transmission, the beams of all CORESETs in the failed SCell will be set to the reported new candidate beam in the step 2 MAC-CE. As a third example of clarifying the BFR response, a UE may select between either the first example or the second example, given above, whichever arrives earlier.

In some aspects, when the base station transmits a BFR response in response to a step 2 MAC-CE transmitted in the payload of msg3 in a 4-step RACH procedure, the BFR response may be clarified. As a first example of clarifying the BFR response, when a base station receives and decodes the payload of msgA in a 4-step RACH procedure, the base station may respond by transmitting a RAR that includes a msg4, which confirms the reception of the msgA payload. In some aspects, when the UE receives the msg4, the UE may respond with an acknowledgment (ACK) indicating that the msg4 was received. Here, the UE may take this msg4 transmission as explicit confirmation that the base station received the msgA payload. Here, the corresponding CORESET beam resetting time may follow one of two options. In a first option, following a predetermined number of symbols after the end of the ACK for the BFR response (e.g., msg4), the UE may set the beams of all CORESETs in the failed SCell to the reported new candidate beam identified in the UE's transmission of the BFR request message. In a second option, following a predetermined number of symbols after the end of the BFR response (e.g., msg4), the UE may set the beams of all CORESETs in the failed SCell to the reported new candidate beam identified in the UE's transmission of the BFR request message. That is, the counting of the predetermined number of symbols may begin either at the end of msg4, or at the end of the ACK for msg4.

As a second example of clarifying the BRF response, in addition to or as an alternative to transmitting a RAR, the base station may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. In these examples, following a predetermined number of symbols after the end of the PDCCH transmission, the beams of all CORESETs in the failed SCell may be set to the reported new candidate beam in the step 2 MAC-CE. As a third example of clarifying the BFR response, a UE may select between either the first example or the second example, given above, whichever arrives earlier. For example, the transmitting circuitry 1442 together with the transceiver 1410, shown and described above in connection with FIG. 14 may provide a means to transmit a beam failure recovery response indicating whether the beam failure recovery request is received.

Figure 16:
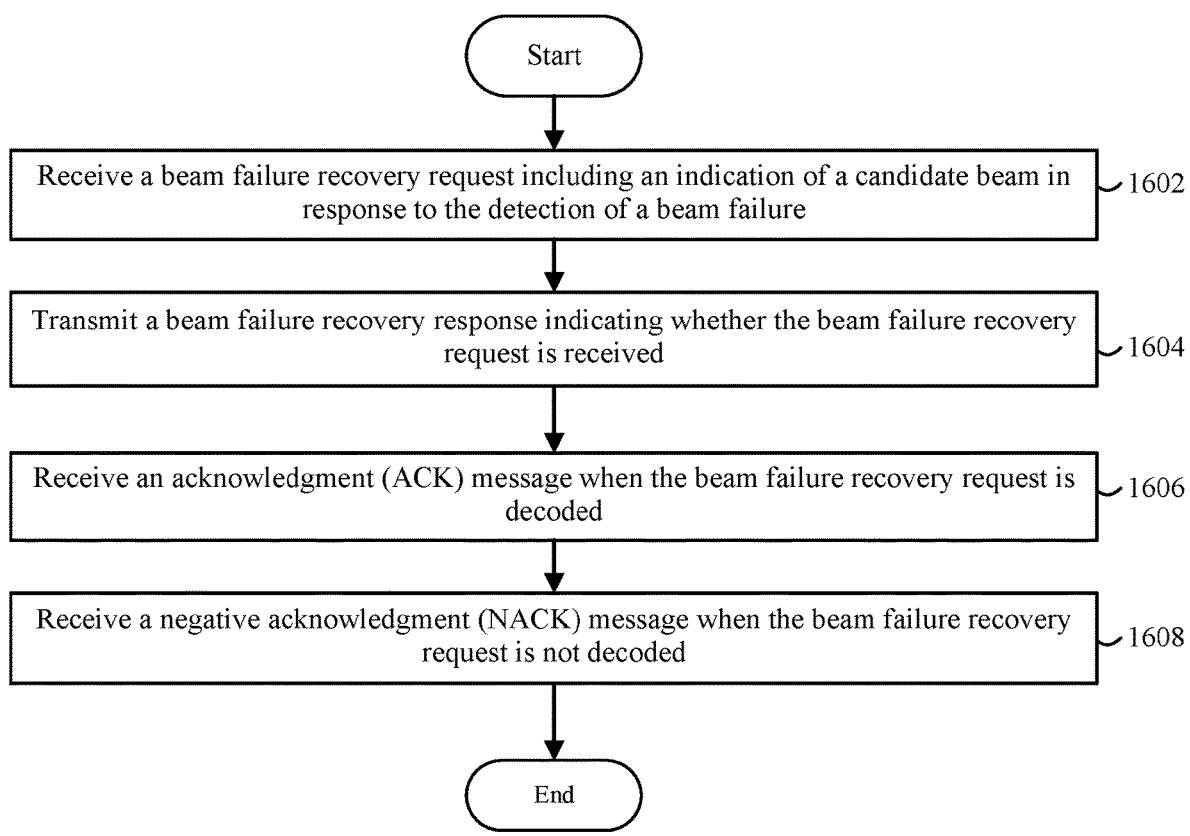
FIG. 16 is a flow chart of a method for beam failure reporting according to some aspects.

FIG. 16 is a flow chart 1600 of a method for beam failure reporting according to some aspects. As described below, some or all illustrated features may be omitted in a particular implementation within the scope of the present disclosure, and some illustrated features may not be required for implementation of all aspects. In some examples, the method may be performed by the base station 1400, as described above, and illustrated in FIG. 14, by a processor or processing system, or by any suitable means for carrying out the described functions.

At block 1602, the base station 1400 may receive a beam failure recovery request including an indication of a candidate beam in response to a detection of a beam failure. For example, the UE may detect a beam failure with a cell. A beam failure may correspond to a condition where a quality of a beam falls to an unacceptably low level. In some aspects, a UE may consider a beam failure instance to occur when a measured quality of a downlink reference signal falls below a given threshold (e.g., a predetermined threshold). In some aspects, the UE may utilize a measurement of a reference signal received power (RSRP) corresponding to a received CSI-RS or SSB. Once the UE detects a given number (e.g., a predetermined number) of consecutive such beam failure instances, the UE may then declare a beam failure. An example of a beam failure detection and recovery procedure may be defined in 3GPP TS 38.321 section 5.17, Release 15 and Release 16. Once a beam failure is detected, a UE may initiate a beam failure recovery (BFR) procedure.

Upon detecting a beam failure, a UE may search for a candidate beam to restore connectivity. The UE may measure a quality (e.g., a RSRP) of one or more reference signals on a given set of candidate beams received from the base station. If the measured quality is greater than a certain threshold (e.g., a predetermined threshold), then that beam may be designated as a candidate beam and may be used to restore connectivity. Once the UE identifies the candidate beam, the UE may trigger the transmission of a beam failure recovery request informing the base station that the UE has detected a beam failure. In some aspects, the beam failure recovery request may include information identifying the candidate beam discovered by the UE during the candidate beam search. In some aspects, the UE may utilize a random access procedure for the transmission of the beam failure recovery request to the base station. For example, the UE may implement a random access procedure by transmitting a random access preamble and a payload (msgA) to the base station. If the base station detects the random access preamble and decodes the payload, the base station may transmits a RAR or message B (msgB) to the UE.

In some aspects, the payload of the random access message (msgA) transmitted by the UE may include information identifying the candidate beam. In some examples, each candidate beam may be associated with a specific random access preamble configuration. Accordingly, the base station may receive the indication of the candidate beam identified by the UE based on detecting the specific random access preamble configuration associated with the candidate beam. In some examples, the payload of the random access message transmitted by the UE may be a medium access control (MAC) control element (MAC-CE) (e.g., a step 2 MAC-CE). In some aspects, a MAC-CE may refer to a series of steps in a beam failure recovery procedure implemented by the UE.

In some examples, the beam failure recovery request may be associated with a hybrid automatic repeat request (HARQ) identification (ID). For example, a base station may receive, from the UE, a beam failure recovery request associated with a HARQ ID. In a 2-step RACH procedure, when the UE's transmission of msgA is assigned or associated with a HARQ ID, then the base station upon receiving the msgA transmission may assign that HARQ ID to a corresponding PDCCH transmission. Further, if the PDCCH transmission schedules an UL transmission, and if that scheduled UL transmission includes uplink control information (UCI), then the HARQ ID may be the HARQ ID of the UCI. In a 4-step RACH procedure, a msg3 of the 4-step RACH procedure may be associated with a HARQ ID of 0. Accordingly, the base station may associate or assign that HARQ ID of 0 to a corresponding PDCCH transmission. For example, the receiving circuitry 1440 together with the transceiver 1410, shown and described above in connection with FIG. 14 may provide a means to receive a beam failure recovery request including an indication of a candidate beam in response to a detection of a beam failure.

At block 1604, the base station 1400 may transmit a beam failure recovery response indicating whether the beam failure recovery request is received. In some aspects, when a base station transmits a BFR response in response to a step 2 MAC-CE transmitted in the payload of msgA in a 2-step RACH procedure, the BFR response may be clarified. As a first example of clarifying the BFR response, when base station receives and decodes the payload of msgA from the UE in a 2-step RACH procedure, the base station may respond by transmitting a RAR that includes a SuccessRAR information element. In some aspects, when the UE receives the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. As a second example of clarifying the BFR response, in addition to or as an alternative to transmitting a RAR, the base station may transmit a PDCCH scheduling DL or UL transmissions with a given HARQ process ID. Here, the PDCCH transmission may serve as the BFR response. When the UE's transmission of msgA has an assigned or associated HARQ ID, then that HARQ ID may accordingly be assigned as the HARQ ID that the base station assigns to the corresponding PDCCH transmission. Further, if the PDCCH transmission schedules an UL transmission, and if that scheduled UL transmission includes uplink control information (UCI), then the above given HARQ ID may be the HARQ ID of the UCI. Still further, the scheduled DL or UL transmissions may include only new transmissions, or alternatively, may include both new transmissions and HARQ retransmissions.

In some aspects, when the base station transmits a BFR response in response to a step 2 MAC-CE transmitted in the payload of msg3 in a 4-step RACH procedure, the BFR response may be clarified. As a first example of clarifying the BFR response, when a base station receives and decodes the payload of msgA in a 4-step RACH procedure, the base station may respond by transmitting a RAR that includes a msg4, which confirms the reception of the msgA payload. In some aspects, when the UE receives the msg4, the UE may respond with an acknowledgment (ACK) indicating that the msg4 was received. Here, the UE may take this msg4 transmission as explicit confirmation that the base station received the msgA payload. As a second example of clarifying the BRF response, in addition to or as an alternative to transmitting a RAR, the base station may transmit a PDCCH scheduling DL or UL transmissions with a given HARQ process ID. In some aspects, the PDCCH transmission may serve as the BFR response. In this example, msg3 of the 4-step RACH procedure has an assigned HARQ ID of 0. Accordingly, that HARQ ID of 0 may be assigned to the corresponding PDCCH transmission. Further, the scheduled DL or UL transmissions may include only new transmissions, or alternatively, may include both new transmissions and HARQ retransmissions. For example, the transmitting circuitry 1442 together with the transceiver 1410, shown and described above in connection with FIG. 14 may provide a means to transmit a beam failure recovery response indicating whether the beam failure recovery request is received.

At block 1606, the base station 1400 may receive an acknowledgment (ACK) message when the beam failure recovery response is decoded. In some aspects, in a 2-step RACH procedure, when base station receives and decodes the payload of msgA from the UE, the base station may respond by transmitting a RAR that includes a SuccessRAR information element. In some aspects, when the UE receives and decodes the SuccessRAR information element in the RAR as msgB, the UE may respond with an acknowledgment (ACK) indicating that the BFR response message was received. Here, the UE may take this SuccessRAR transmission as explicit confirmation that the base station received the msgA payload. In some aspects, in a 4-step RACH procedure, when the base station receives and decodes the payload of msgA, the base station may respond by transmitting a RAR that includes a msg4, which confirms the reception of the msgA payload. In some aspects, when the UE receives and decodes the msg4, the UE may respond with an acknowledgment (ACK) indicating that the msg4 was received. Here, the UE may take this msg4 transmission as explicit confirmation that the base station received the msgA payload. For example, the receiving circuitry 1440 together with the transceiver 1410, shown and described above in connection with FIG. 14 may provide a means to receive an acknowledgment (ACK) message when the beam failure recovery response is decoded.

At block 1608, the base station 1400 may receive a negative acknowledgment (NACK) message when the beam recovery response is not decoded. In some aspects, in a 2-step RACH procedure, when base station receives and decodes the payload of msgA from the UE, the base station may respond by transmitting a RAR that includes a SuccessRAR information element. In some aspects, when the UE receives the SuccessRAR information element in the RAR as msgB, the UE may be unable to decode the SuccessRAR information element. The UE may respond with a negative acknowledgment (NACK) indicating that the BFR response message was received, but not decoded. The UE may not apply the candidate beam indicated in the beam failure recovery request for a downlink control and may not reset the beams of all CORESETs in the failed SCell to the reported new candidate beam identified in the UE's transmission of the BFR request message. In some aspects, upon transmitting the NACK, the UE may apply the candidate beam indicated in the beam failure recovery request for a downlink control and may reset the beams of all CORESETs in the failed SCell to the reported new candidate beam identified in the UE's transmission of the BFR request message following a predetermined number of symbols after an end of the beam failure recovery response described herein.

In some aspects, in a 4-step RACH procedure, when the base station receives and decodes the payload of msgA, the base station may respond by transmitting a RAR that includes a msg4, which confirms the reception of the msgA payload. When the UE receives the msg4, the UE may be unable to decode the msg4. The UE may respond with a negative acknowledgment (NACK) indicating that the msg4 was received, but not decoded. The UE may not apply the candidate beam indicated in the beam failure recovery request for a downlink control and may not reset the beams of all CORESETs in the failed SCell to the reported new candidate beam identified in the UE's transmission of the BFR request message. In some aspects, upon transmitting the NACK, the UE may apply the candidate beam indicated in the beam failure recovery request for a downlink control and may reset the beams of all CORESETs in the failed SCell to the reported new candidate beam identified in the UE's transmission of the BFR request message following a predetermined number of symbols after an end of the beam failure recovery response described herein. For example, the receiving circuitry 1440 together with the transceiver 1410, shown and described above in connection with FIG. 14 may provide a means to receive a negative acknowledgment (NACK) message when the beam recovery response is not decoded.

In one configuration, the base station 1400 includes means for performing the various functions and processes described in relation to FIGS. 15 and 16. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-4, 7-11, and 14 and utilizing, for example, the processes and/or algorithms described herein in relation to FIGS. 15 and 16.

In a first aspect, a wireless communication device (e.g., a UE) may detect a beam failure within a cell. The wireless communication device may also transmit a beam failure recovery request in response to detecting the beam failure. The beam failure recovery request may be associated with a hybrid automatic repeat request (HARQ) identification (ID). The beam failure recovery request may include an indication of a candidate beam. The wireless communication device may further receive a beam failure recovery response comprising a downlink control channel including the HARQ ID associated with the beam failure recovery request. The beam failure recovery response indicates whether the beam failure recovery request is received.

In a second aspect, alone or in combination with the first aspect, the beam failure recovery response further comprises a random-access response.

In a third aspect, alone or in combination with one or more of the first and second aspects, following a predetermined number of symbols after an end of the beam failure recovery response, the wireless communication device may apply the candidate beam indicated in the beam failure recovery request for a downlink channel.

In a fourth aspect, alone or in combination with one or more of the first through third aspects, the wireless communication device may transmit an acknowledgment (ACK) message when the beam failure recovery response is decoded.

In a fifth aspect, alone or in combination with one or more of the first through fourth aspects, following a predetermined number of symbols after an end of the ACK message, the wireless communication device may apply the candidate beam indicated in the beam failure recovery request for a downlink channel.

In a sixth aspect, alone or in combination with one or more of the first through fifth aspects, the wireless communication device may transmit a negative acknowledgment (NACK) message when the beam failure recovery response is not decoded.

In a seventh aspect, a base station in a wireless communication system may receive, from a user equipment (UE), a beam failure recovery request indicating a beam failure within a cell associated with the base station. The beam failure recovery request is associated with a hybrid automatic repeat request (HARQ) identification (ID). The beam failure recovery request includes an indication of a candidate beam. The base station may also transmit a beam failure recovery response to the UE comprising a downlink control channel including the HARQ ID associated with the beam failure recovery request. The beam failure recovery response indicates whether the beam failure recovery request is received.

In an eighth aspect, alone or in combination with the seventh aspect, the beam failure recovery response further comprises a random-access response.

In a ninth aspect, alone or in combination with one or more of the seventh and eighth aspects, the base station may receive an acknowledgment (ACK) message from the UE when the beam failure recovery response is decoded by the UE.

In a tenth aspect, alone or in combination with one or more of the seventh through ninth aspects, the base station may receive a negative acknowledgment (NACK) message from the UE when the beam failure recovery response is not decoded by the UE.

In one configuration, a wireless communication device includes means for detecting a beam failure within a cell, means for transmitting a beam failure recovery request in response to detecting the beam failure, where the beam failure recovery request is associated with a hybrid automatic repeat request (HARQ) identification (ID), and where the beam failure recovery request includes an indication of a candidate beam, and means for receiving a beam failure recovery response comprising a downlink control channel including the HARQ ID associated with the beam failure recovery request, where the beam failure recovery response indicates whether the beam failure recovery request is received.

In one aspect, the aforementioned means for detecting a beam failure within a cell, means for transmitting a beam failure recovery request in response to detecting the beam failure, where the beam failure recovery request is associated with a hybrid automatic repeat request (HARQ) identification (ID), and where the beam failure recovery request includes an indication of a candidate beam, and means for receiving a beam failure recovery response comprising a downlink control channel including the HARQ ID associated with the beam failure recovery request, where the beam failure recovery response indicates whether the beam failure recovery request is received may be the processor(s) 1104 shown in FIG. 11 configured to perform the functions recited by the aforementioned means. For example, the aforementioned means for detecting a beam failure within a cell may include the detecting circuitry 1140 in FIG. 11. As another example, the aforementioned means for transmitting a beam failure recovery request in response to detecting the beam failure may include the transmitting circuitry 1142 and transceiver 1110 shown in FIG. 11. As yet another example, the aforementioned means for receiving a beam failure recovery response comprising a downlink control channel including the HARQ ID associated with the beam failure recovery request may include the receiving circuitry 1144 and transceiver 1110 shown in FIG. 11. In another aspect, the aforementioned means may be a circuit or any apparatus configured to perform the functions recited by the aforementioned means.

In one configuration, a base station includes means for receiving, from a user equipment (UE), a beam failure recovery request indicating a beam failure within a cell associated with the base station, where the beam failure recovery request is associated with a hybrid automatic repeat request (HARQ) identification (ID), and where the beam failure recovery request includes an indication of a candidate beam, and means for transmitting a beam failure recovery response to the UE comprising a downlink control channel including the HARQ ID associated with the beam failure recovery request, where the beam failure recovery response indicates whether the beam failure recovery request is received.

In one aspect, the aforementioned means for receiving, from a user equipment (UE), a beam failure recovery request indicating a beam failure within a cell associated with the base station, where the beam failure recovery request is associated with a hybrid automatic repeat request (HARQ) identification (ID), and where the beam failure recovery request includes an indication of a candidate beam, and means for transmitting a beam failure recovery response to the UE comprising a downlink control channel including the HARQ ID associated with the beam failure recovery request, where the beam failure recovery response indicates whether the beam failure recovery request is received may be the processor(s) 1404 shown in FIG. 14 configured to perform the functions recited by the aforementioned means. For example, the aforementioned means for receiving, from a user equipment (UE), a beam failure recovery request indicating a beam failure within a cell associated with the base station may include the receiving circuitry 1140 and transceiver 1410 shown in FIG. 14. As another example, the aforementioned means for transmitting a beam failure recovery response to the UE comprising a downlink control channel including the HARQ ID associated with the beam failure recovery request may include the transmitting circuitry 1442 and transceiver 1410 shown in FIG. 14. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 7-10, and 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), the method comprising:
   detecting a beam failure within a cell;
   transmitting a beam failure recovery request in response to detecting the beam failure, wherein the beam failure recovery request is associated with a hybrid automatic repeat request (HARQ) identification (ID), and wherein the beam failure recovery request includes an indication of a candidate beam;
   receiving a beam failure recovery response comprising a downlink control channel including the HARQ ID associated with the beam failure recovery request, wherein the beam failure recovery response indicates whether the beam failure recovery request is received;
   transmitting an acknowledgment (ACK) message when the beam failure recovery response is decoded; and
   following a predetermined number of symbols after an end of the ACK message, applying the candidate beam indicated in the beam failure recovery request for a downlink channel.

2. The method of claim 1, wherein the beam failure recovery response further comprises a random-access response.

3. The method of claim 1, further comprising:
   transmitting a negative acknowledgment (NACK) message when the beam failure recovery response is not decoded.

4. A method of wireless communication operable at a base station, the method comprising:
   receiving, from a user equipment (UE), a beam failure recovery request indicating a beam failure within a cell associated with the base station, wherein the beam failure recovery request is associated with a hybrid automatic repeat request (HARQ) identification (ID), and wherein the beam failure recovery request includes an indication of a candidate beam; and
   transmitting a beam failure recovery response to the UE comprising a downlink control channel including the HARQ ID associated with the beam failure recovery request, wherein the beam failure recovery response indicates whether the beam failure recovery request is received, wherein the beam failure recovery response further comprises a control resource set (CORESET) beam resetting time of a specified number of symbols after the end of an ACK message acknowledging receiving the beam failure recovery response.

5. The method of claim 4, further comprising:
receiving an acknowledgment (ACK) message from the UE when the beam failure recovery response is decoded by the UE.

6. The method of claim 4, further comprising:
receiving a negative acknowledgment (NACK) message from the UE when the beam failure recovery response is not decoded by the UE.

7. A user equipment (UE) for wireless communication in a wireless communication network, comprising:
a wireless transceiver;
a memory; and
a processor communicatively coupled to the wireless transceiver and the memory, wherein the processor and the memory are configured to:
detect a beam failure within a cell,
transmit a beam failure recovery request in response to detecting the beam failure, wherein the beam failure recovery request is associated with a hybrid automatic repeat request (HARQ) identification (ID), and wherein the beam failure recovery request includes an indication of a candidate beam,
receive a beam failure recovery response comprising a downlink control channel including the HARQ ID associated with the beam failure recovery request, wherein the beam failure recovery response indicates whether the beam failure recovery request is received;
transmit an acknowledgment (ACK) message when the beam failure recovery response is decoded; and
following a predetermined number of symbols after an end of the ACK message, apply the candidate beam indicated in the beam failure recovery request for a downlink channel.

8. The UE of claim 7, wherein the beam failure recovery response further comprises a random-access response.

9. The UE of claim 7, wherein the processor and the memory are further configured to:
transmit a negative acknowledgment (NACK) message when the beam failure recovery response is not decoded.

10. A base station for wireless communication in a wireless communication network, comprising:
a wireless transceiver;
a memory; and
a processor communicatively coupled to the wireless transceiver and the memory, wherein the processor and the memory are configured to:
receive, from a user equipment (UE), a beam failure recovery request indicating a beam failure within a cell associated with the base station, wherein the beam failure recovery request is associated with a hybrid automatic repeat request (HARQ) identification (ID), and wherein the beam failure recovery request includes an indication of a candidate beam, and
transmit a beam failure recovery response to the UE comprising a downlink control channel including the HARQ ID associated with the beam failure recovery request, wherein the beam failure recovery response indicates whether the beam failure recovery request is received, wherein the beam failure recovery response further comprises a control resource set (CORESET) beam resetting time of a specified number of symbols after the end of an ACK message acknowledging receiving the beam failure recovery response.

11. The base station of claim 10, wherein the processor and the memory are further configured to:
receive an acknowledgment (ACK) message from the UE when the beam failure recovery response is decoded by the UE.

12. The base station of claim 10, wherein the processor and the memory are further configured to:
receive a negative acknowledgment (NACK) message from the UE when the beam failure recovery response is not decoded by the UE.

13. A user equipment (UE), comprising:
means detecting a beam failure within a cell;
means for transmitting a beam failure recovery request in response to detecting the beam failure, wherein the beam failure recovery request is associated with a hybrid automatic repeat request (HARQ) identification (ID), and wherein the beam failure recovery request includes an indication of a candidate beam;
means for receiving a beam failure recovery response comprising a downlink control channel including the HARQ ID associated with the beam failure recovery request, wherein the beam failure recovery response indicates whether the beam failure recovery request is received,
means for transmitting an acknowledgment (ACK) message when the beam failure recovery response is decoded, and
following a predetermined number of symbols after an end of the ACK message, means for applying the candidate beam indicated in the beam failure recovery request for a downlink channel.

14. The UE of claim 13, wherein the beam failure recovery response further comprises a random-access response.

15. The UE of claim 13, further comprising:
means for transmitting a negative acknowledgment (NACK) message when the beam failure recovery response is not decoded.

16. A base station, comprising:
means for receiving, from a user equipment (UE), a beam failure recovery request indicating a beam failure within a cell associated with the base station, wherein the beam failure recovery request is associated with a hybrid automatic repeat request (HARQ) identification (ID), and wherein the beam failure recovery request includes an indication of a candidate beam; and
means for transmitting a beam failure recovery response to the UE comprising a downlink control channel including the HARQ ID associated with the beam failure recovery request, wherein the beam failure recovery response indicates whether the beam failure recovery request is received, wherein the beam failure recovery response further comprises a control resource set (CORESET) beam resetting time of a specified number of symbols after the end of an ACK message acknowledging receiving the beam failure recovery response.

17. The base station of claim 16, further comprising:
means for receiving an acknowledgment (ACK) message from the UE when the beam failure recovery response is decoded by the UE.

18. The base station of claim 16, further comprising:
means for receiving a negative acknowledgment (NACK) message from the UE when the beam failure recovery response is not decoded by the UE.

* * * * *